United States Patent [19]

Tyburski

[11] 4,258,430

[45] Mar. 24, 1981

[54] INFORMATION COLLECTION AND STORAGE SYSTEM WITH REMOVABLE MEMORY

[76] Inventor: Robert M. Tyburski, 4918 Briar St., Fairfax, Va. 22032

[21] Appl. No.: 967,845

[22] Filed: Dec. 8, 1978

Related U.S. Application Data

[63] Continuation-in-part of Ser. No. 876,164, Feb. 8, 1978, abandoned.

[51] Int. Cl.[3] ...................... G06F 13/00; G08G 1/065

[52] U.S. Cl. ................................ 364/900; 235/92 TC

[58] Field of Search ................ 364/900 MS File, 437, 364/438; 235/92 TC, 92 DP, 92 AC; 340/38 R

[56] References Cited

U.S. PATENT DOCUMENTS

| | | | |
|---|---|---|---|
| 3,397,306 | 8/1969 | Auer, Jr. | 364/437 |
| 3,549,869 | 12/1970 | Kuhn | 235/92 R |
| 3,823,388 | 7/1974 | Chadima, Jr. et al. | 364/900 |
| 3,870,901 | 3/1975 | Smith et al. | 307/238 |
| 3,878,371 | 4/1975 | Burke | 235/92 PD |
| 3,922,649 | 11/1975 | Thome | 365/233 |
| 3,959,633 | 5/1976 | Lawrence et al. | 235/92 T |
| 3,980,935 | 9/1976 | Worst | 365/229 |
| 4,005,409 | 1/1977 | Feuer | 340/347 C |

FOREIGN PATENT DOCUMENTS

| | | | |
|---|---|---|---|
| 901465 | 2/1959 | United Kingdom | 235/92 R |

OTHER PUBLICATIONS

Anderson, R. D. et al., "Volatile Memory Data Retention", *IBM T.D.B.*, vol. 14, No. 9, Feb. 1972, pp. 2712-2713.

"Tiny Computer," *Popular Science*, Feb. 1977, p. 75.

"Infopac I½ Data Terminal," *Azur Data Literature*, Mar. 1976.

*Primary Examiner*—Raulfe B. Zache

*Attorney, Agent, or Firm*—Le Blanc, Nolan, Shur & Nies

[57] ABSTRACT

An information collection and storage system and method wherein pulses representing sensed information are counted and wherein resulting pulse counts are written into a volatile random access memory which forms a part of a detachable battery powered memory pack. The memory pack is selectively removable from the system and has a rechargeable battery which supplies the sole source of operating power for preserving the data stored in the volatile memory both when the memory pack is connected in the system and removed from the system for transit to a data read-out center.

46 Claims, 11 Drawing Figures

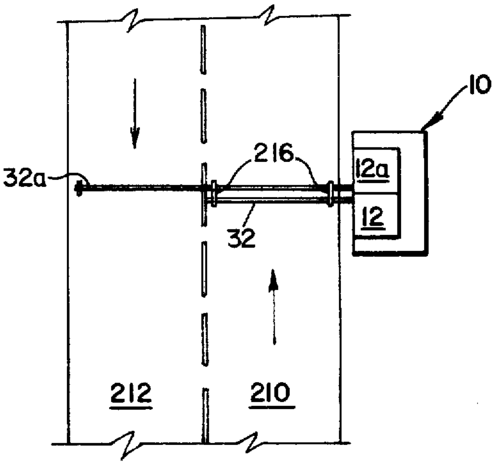
FIG. 6
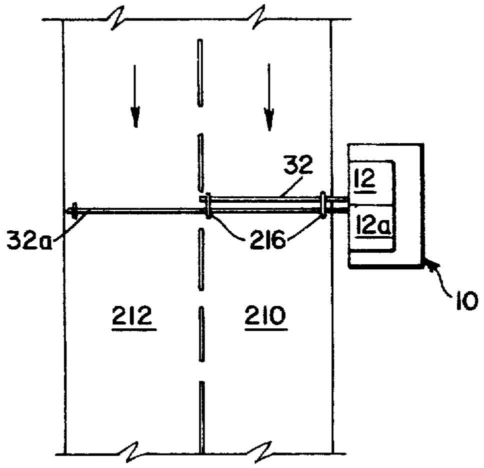
FIG. 7
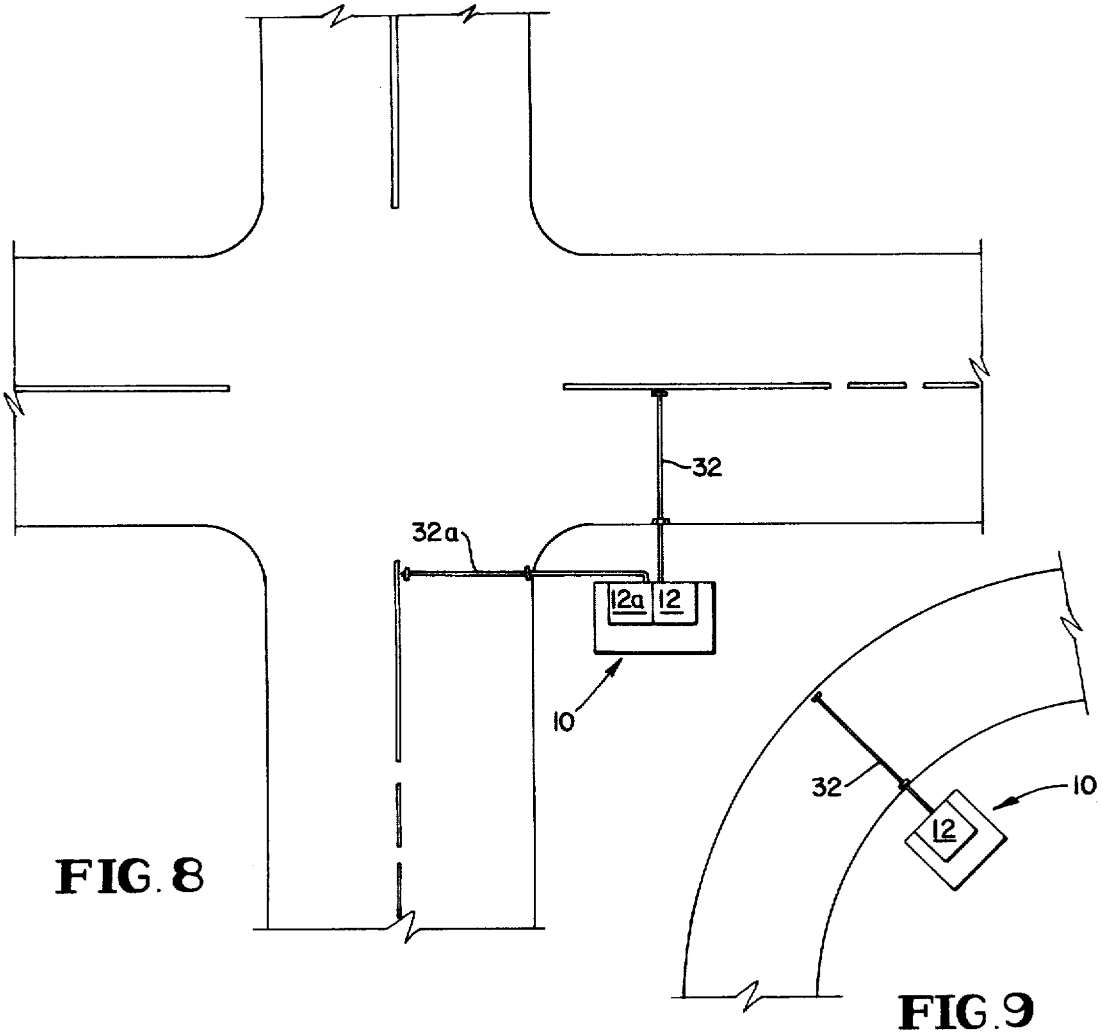
FIG. 8
FIG. 9

INFORMATION COLLECTION AND STORAGE SYSTEM WITH REMOVABLE MEMORYRELATED APPLICATION

This application is a continuation-in-part of my co-pending application Ser. No. 876,164 filed on Feb. 8, 1978 now abandoned for Information Collection And Storage System With Removable Memory.

FIELD OF INVENTION

This invention relates to systems for collecting and storing information and particularly to information collection systems having a removable information storage device or unit which is transportable from one location to another without losing the stored information.

BACKGROUND OF THE INVENTION

One example of an information collection and storage system to which this invention relates is a vehicular traffic counting recorder. Such traffic recorders are used to record data relating to the number of vehicles passing a given location on a roadway.

In an existing type of traffic recorder, traffic data is stored in the form of perforations on a removable paper tape in the recorder. This type of paper tape recorder is customarily equipped with an electromechanical accumulator and a timer. The electromechanical accumulator totalizes pulses from a traffic-sensing transducer, and on command from the timer, the count total or sum accumulated in the accumulator is periodically punched by mechanical punch equipment on the paper tape in the form of a binary code.

The punched paper tapes in recorders at different roadway locations are customarily collected after several days of field operation and placed in paper tape reader at a data processing center for recovering the stored traffic information. This type of electromechanical traffic counter or recorder has a number of problems and drawbacks.

First, faulty recording operations often occur due to expansion of the paper tape under the influence of environmental conditions. Upon expanding the tape may jam in the punch, tear or otherwise become damaged. Sometimes, only partial holes are punched in the tape for various reasons to result in the improper read-out of data stored on the tape. Because the recorder is often left unattended for several days or more at its roadway location valuable data may be lost due to these faulty operations.

Another drawback of these prior paper tape traffic recorders is that the tape requires carefully handling to avoid damage and resultant loss of data. Furthermore, the data read-out speed of perforated paper tape reader mechanisms is relatively slow as compared with the speed at which stored information may be read out from semiconductor or other electrical memory units.

Additionally the mechanical components of these prior electromechanical traffic recorders require frequent maintenance and tend to be unreliable in operation. These mechanical components also add considerably to the weight and bulk of the recorder and require considerable power for operation. Batteries for this type of traffic recorder are therefore costly.

Another drawback of known electromechanical traffic recorders of the type described above is that the traffic count stored on the paper tape at the end of each time interval set by the timer represents a cumulative total of the counts occurring in all of the preceding timer intervals rather than the count occuring in each individual timer interval. For example, if the counts of 10, 15 and 25 are registered in the first, second and third timer periods, respectively, the count of 10 will first be stored on the tape at the end of the first period, the count of 25 will next be stored on the tape at the end of the second period, and the count of 50 will be finally stored on the tape at the end of the third period. These cumulative count totals require special translator or computer program instructions to recover the individual totals (10, 15 and 25 in the foregoing example) for each timer interval.

The present invention avoids the foregoing problems and drawbacks as well as offering additional advantages as will become apparent from the following summary and detailed description.

SUMMARY & OBJECTS OF THE INVENTION

In the information collection and storage system of this invention, a memory pack having a semiconductor memory is used to store the desired information instead of the paper tape. The memory pack is detachably plugged into a data input and control unit or circuit so that is can selectively be removed as a unit from the information storage system for transportation to a remote station such as a data processing or information gathering center. A count of the transducer-produced pulses is accumulated in an accumulator or counter in the data input and control unit and is periodically transferred to and written into the memory in the removable memory pack while continuing to accumulate a count of the transducer-produced pulses.

In the illustrated embodiment the periodic transfer of the pulse count to the memory is accomplished by first parallel loading the accumulated count into a shift register at the end of each recurring counting period and then serially shifting the count from the shift register into the memory of the removable memory pack. As soon as the count in the accumulator is transferred to the shift register at the end of each counting period, the accumulator is reset to zero to begin accumulating a new count while the contents of the shift register are serially shifted into the memory of the removable memory pack. The memory is advantageously of the relatively inexpensive volatile type.

The removable memory pack is self-contained in the sense that it contains its own battery supply. The battery is used as the sole source of power for the memory to preserve the data written into the memory not only when the removable memory pack is plugged into the data input and control unit, but also when the memory pack is disconnected from the data input and control unit and is removed from the information storage system. In the illustrated embodiment, the battery in the removable memory pack is also used to supply the power for the circuitry in the remainder of the information storage system.

Preferably, the count accumulated in each recurring counting period is non-cumulatively stored at different address locations in the memory of the removable memory pack. This is accomplished by controls in the data input and control unit which develop appropriate addresses for the storage of the counts transferred to the memory.

Because the stored data in the present invention is in electrical binary form, rather than paper tape perforations, the extraction or read-out of the stored data is infinitely more reliable and can be accomplished at computer speeds. Additionally, the information collection and storage system of this invention has the following advantages: a simplified circuit design; reliable operation of hardware; low manufacturing costs; low battery costs; low maintenance costs; and low systems costs.

In the first illustrated embodiment of this invention the information collection and storage system is of the single channel type. In the second illustrated embodiment of this invention a second signal channel is added to provide a dual channel arrangement having two separate traffic-sensing inputs and two separate outputs for separately recording the digital information transmitted by each signal channel.

The dual channel arrangement may optionally include means for selectively rejecting unwanted traffic count pulses in one channel to accomodiate situations where pneumatic road tubes are used as the traffic-sensing devices are where one of the tubes extends across a traffic lane in which the other road tube is placed. Such situations can arise, for example, when using the dual channel arrangement of this invention to count two-way traffic.

According to the illustrated embodiment of the dual channel arrangement the vehicle axle counts in each channel are divided by two to provide dual axle vehicle counts. Additionally, each channel may optionally be equipped to divide the transducer's axle count pulses by 4 to accomodate applications in which the vehicle-sensing road tube is placed on a curved road of such small radius that each wheel of a four-wheeled vehicle will produce a separate pulse. The dual channel arrangement of this invention may also include equipment for optionally storing the sum of vehicle counts from both channels in a single memory pack.

In addition to the foregoing both of the single channel and dual channel embodiments may be equipped with a special circuit whereby a pre-selected code is programmed in the memory pack to signal the end of one traffic recording operation before another traffic recording operation is initiated with the same memory pack. This feature is particularly useful in situations where it is desired to transport the information recording system of this invention to different sites or locations for collecting traffic or other data at each side. For such applications the special code mentioned above is used to signal the end of each recording operation to thereby separate the different traffic counts from each other. In this manner, the traffic count recorded at each side is determinable upon read-out of the stored information.

According to another feature of this invention the recording system may optionally be equipped with a novel detection circuit for indicating the maximum number of hours that elapsed without sensing the passage of any traffic on the roadway being monitored. If the number of hours or other time period is high for expected traffic conditions then the operator of the recording system is alerted to a possible malfunction.

Although the system of the present invention is particularly applicable for recording traffic data, such as vehicle axles, it also may be used for numerous other purposes. For example, when interfaced with the appropriate transducer, it may be used to collect and store such information or data as rain measurements, water flow measurements, water pollution measurements and air pollution measurements.

With the foregoing in mind a major object of this invention is to provide a novel information collection and storage system which is not subject to the previously described disadvantages of paper tape recorders.

Another major object of this invention is to provide a novel information collection and storage system in which collected information is stored in the memory element of a removable, self-contained memory and battery pack.

A more specific object of this invention resides in the provisions of a novel information recording system and method in which a count of the number of transducer-produced pulses is accumulated by an accumulator in a data input and control circuit and in which the count accumulated in the accumulator is periodically transferred to and stored in a battery powered integrated circuit memory in a removable memory pack.

Still another object of this invention is to provide a novel electrical system having an economical simplified circuit design for storing data in a removable memory pack.

A further object of this invention is to provide a novel plural channel information recording system having separate channel inputs for separately sensing traffic or other information and separate outputs for separately recording the sensed information in each channel.

Still another object of this invention is to provide a novel plural channel information recording system as described in the preceding object wherein the plural channel arrangement has any one or more of the following features:

1. A means for utilizing the two channels to record two-way traffic with pneumatic-sensing road tubes in an arrangement where one of the road tubes extends across the traffic lane in which the other road tube is placed.
2. A selectively operable means for storing the sum of vehicle or traffic counts from both channels in one memory pack.

Still another object of this invention is to provide a novel traffic recording system having means for optionally dividing the vehicle axle counts by four for counting traffic on curved road sections of small radius.

Still another object of this invention is to provide a novel traffic recording system in which a circuit indicates the maximum time that occurred without traffic.

A further object of this invention resides in the provision of a novel traffic recording system having means for selectively skipping over certain storage or character locations that are pre-recorded with coded data to thereby signal the completion of a particular traffic counting operation.

A further object of this invention resides in the provision of a novel traffic recording system having means for generating an audible sound for each count that is counted in by the system.

Further objects and novel features of this invention will appear as the description proceeds in connection with the appended claims and below-described drawings.

DESCRIPTION OF DRAWINGS

FIG. 6 schematically illustrates one roadway application of the dual channel recording system for recording two-way traffic;

FIG. 7 schematically illustrates another roadway application of the dual channel recording system for counting traffic flowing in a common direction in two lanes;

FIG. 8 schematically illustrates still another application of the dual recording system for recording two-directional traffic;

FIG. 9 schematically illustrates an application of either the single or dual recording system for recording traffic travelling on a curved road section of short radius;

DETAILED DESCRIPTION

Figure 1:
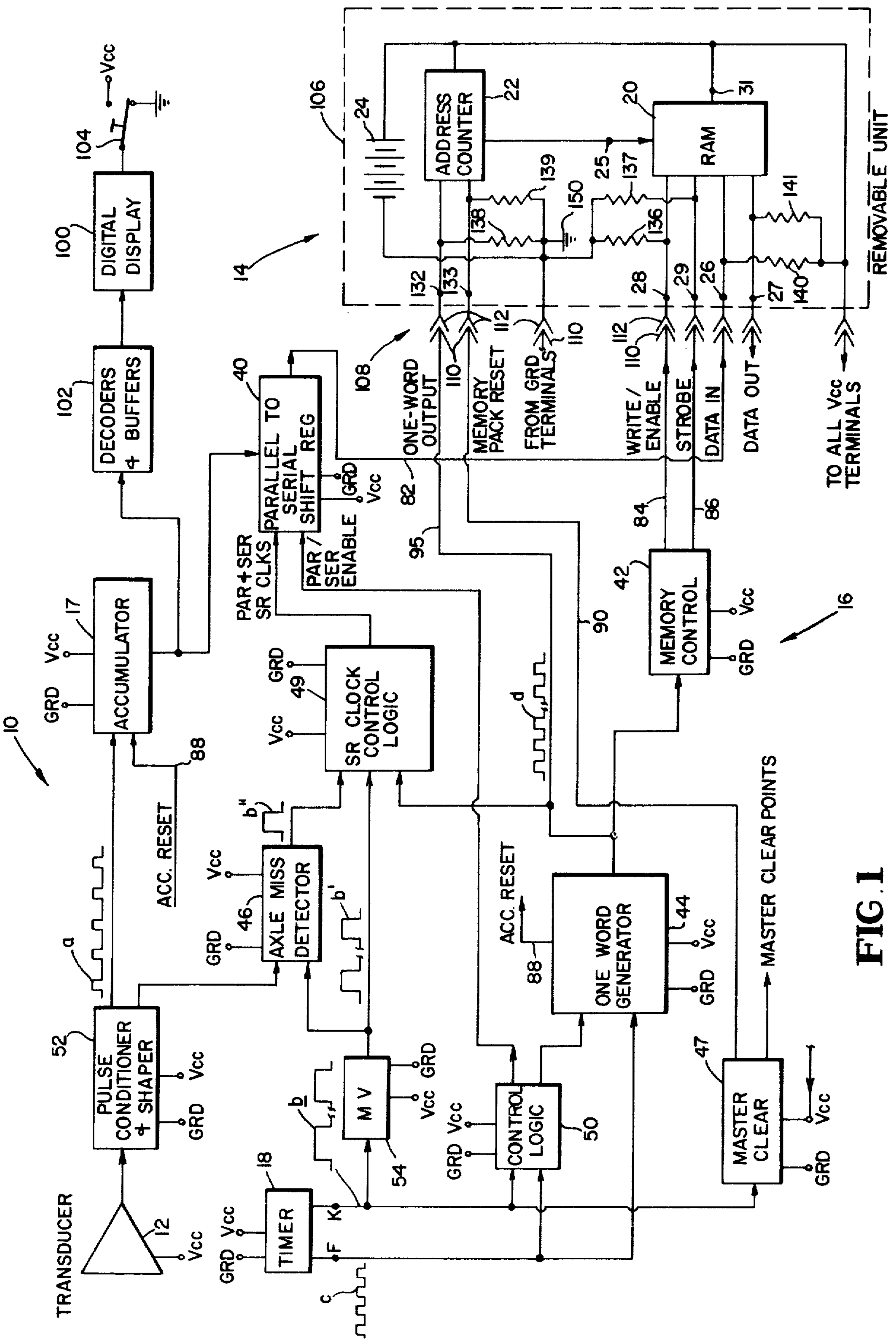
FIG. 1 is a schematic diagram of a single channel information collection and storage system incorporating the principles of this invention.
Figure 2:
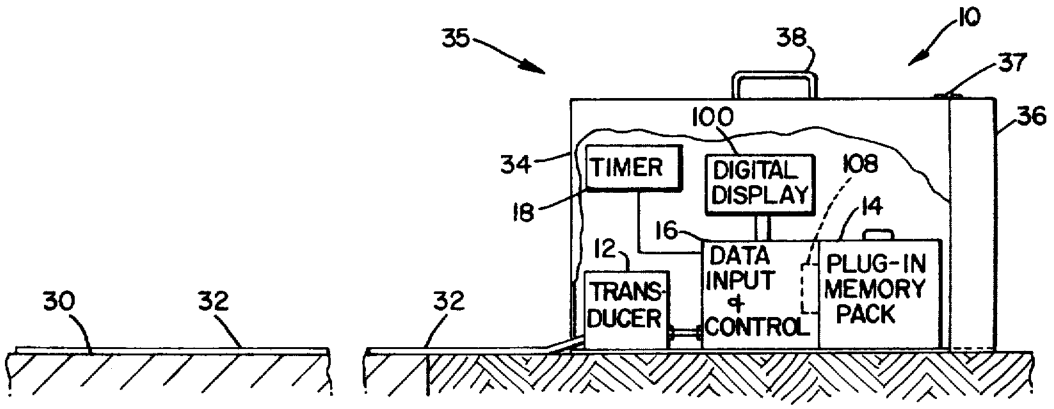
FIG. 2 is a generally schematic elevation of an axle-counting traffic recorder incorporating the system shown in FIG. 1.

In FIGS. 1 and 2 of the drawings, the information collection and storage system embodying various principles of this invention is generally indicated at 10 and mainly comprises a transducer 12, a selectively removable memory and battery pack or module 14, and a digital data input and control unit or circuit 16. In the illustrated embodiment, transducer 12 is of the type that produces an electrical digital signal in which the number of serially occurring pulses (indicated at a in FIG. 1) is indicative of a sensed condition or event. This digital signal is fed to the data input and control circuit or unit 16 which is interfaced or connection between transducer 12 and the removable memory pack 14.

As will be described in detail shortly, the data input and control unit 16 includes a counter or accumulator 17 for counting the number of pulses in the transducer's digital output signal. Unit 16 also includes control circuitry whereby the count in accumulator 17 is periodically transferred to and stored in the memory of memory pack 14 under the control of a timer 18.

Figure 3:
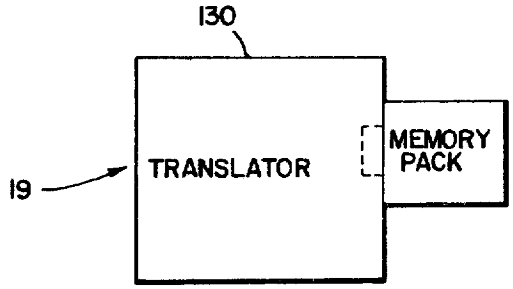
FIG. 3 is a schematic diagram wherein the removable memory pack of FIGS. 1 and 2 is shown to be plugged into a translator or data processor.

In accordance with one feature of this invention, memory pack 14 is removably plugged into or otherwise readily detachably connected to the data input and control unit 16 so that it can conveniently be removed as a unit from system 10 for transportation to a remote station such as the central processing station 19 (see FIG. 3) where the data stored in memory pack 14 is read out for examination and/or processing.

To accomplish the foregoing information storage and read-out operations, memory pack 14 is provided with a suitable read/write or random access semiconductor memory (RAM) as indicated at 20 in FIG. 1. Advantageously, memory 20 is of the CMOS typs and may be a conventional IC memory circuit for use with an address counter 22 and appropriate addressing logic for addressing the different locations in memory 20. Because of the volatile nature of the CMOS memory and further because of the desireablility of transporting the memory pack 14 without losing the stored data, memory pack 14 includes its own power source in the form of a rechargeable battery 24.

Battery 24, rather than being a standby or auxiliary source of power, is the primary and sole power source for operating the addressing logic in memory pack 14 and for preserving the data stored in memory 20 not only when the memory pack 14 is unplugged or disconnected from the data input and control unit 16, but also when memory pack 14 is plugged in and connected to the circuitry in unit 16.

In the illustrated embodiment, battery 24 also used to furnish power to transducer 12 and the circuitry in the data input and control unit 16. System 10 therefore has a single power source which is incorporated as part of the removable memory pack 14. Alternatively, a separate battery source may be used for powering the circuitry outboard of the removable memory pack 14, but this arrangement requires the periodic recharging or replacement of two batteries and therefore does not possess the advantages of the single battery arrangement shown in the drawings.

It is understood that memory 20 includes the usual memory array of bit-storing semiconductor devices and the usual unshown interface circuitry, including the address register, drivers and other component parts. In the illustrated embodiment memory 20 includes a set of address terminals or lines 25 (one shown), a data input terminal or line 26, a data output terminal or line 27, a write/enable terminal or line 28, a strobe terminal or line 29 and a power input terminal of line 31. The output of the address counter is applied to the address terminals 25 which may collectively be referred to as an address port for addressing the memory. Battery is connected to terminal 31 to apply power to memory 20.

In the illustrated embodiment, in which the system 10 is used as a vehicular traffic counter, transducer 12 is constructed to provide a count of vehicular traffic passing a pre-selected point on a road or roadway 20 (see FIG. 2). Alternatively, transducer 12 may be constructed to sense some other condition or event such as the amount of rainfall. For such an application the transducer may be constructed to produce an electrical analog signal which is indicative of the amount of rainfall at a pre-selected place. To convert the analog signal into binary form the transducer may have an analog-to-digital converter for converting samples of the analog signal into a digital signal.

In the particular embodiment illustrated in FIG. 2, transducer 12 provides a count of the number of vehicle axles passing over a selected point or place or roadway 30. For this purpose transducer 12 is conventionally equipped with an elongated, hollow, pneumatic road tube 32 (see FIG. 2) which is stretched across one or more traffic lanes on roadway 30. Tube 32 is closed at its outer end and has its inner end opening into a transducing apparatus. With this construction an air pressure wave is produced within the tube by passage of a vehicle axle over the tube and is converted into an electrical pulse. In this embodiment, therefore, transducer 12 produces a digital pulse signal in which the number of serially occurring pulses is equal to the number of vehicle axles passing over road tube 32.

For the vehicle axle counting application shown in FIG. 2 the component parts of system 10 are advantageously mounted in a portable housing or carrying case 34 so that the system 10 takes the form of a portable, modular unit (as indicated at 35 in FIG. 2) which can be transported to a selected road location where it is desired to collect or accumulate vehicle traffic data. As shown in FIG. 2, carrying case 34 is advantageously provided with a lockable cover 36 which may be hinged at 37 to provide access to the component parts of system 10 within the carrying case. For convenience, case 34 may also be provided with a carrying handle 38.

Figure 4:
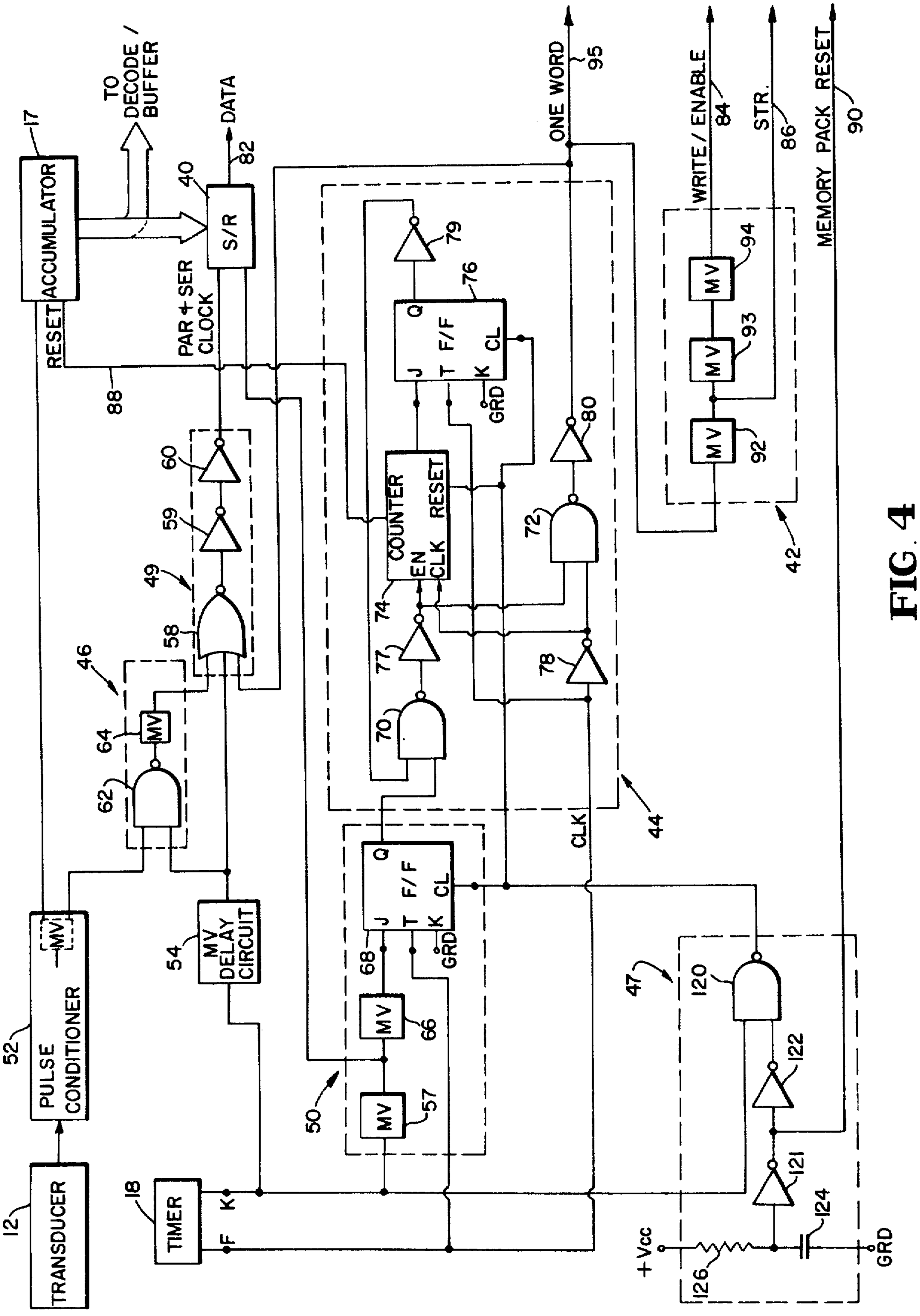
FIG. 4 is a schematic circuit diagram of the data input and control unit shown in FIGS. 1 and 2.

In addition to accumulator 17 and timer 18, the data input and control unit 16 includes a shift register 40, a memory control 42, a one-word generator 44, an axle miss detector 46, a master clear or reset circuit 47 and logic control circuits 49 and 50, all as shown in FIGS. 1 and 4. Timer 18 may be of any suitable free running, selectable type.

In the illustrated embodiment timer 18 cyclically or periodically times out to generate a single output pulse b (hereinafter referred to as the timer sample pulse) at an output terminal K. The frequency of the timer sample pulse preferably is selectively adjustable. The clock pulses (indicated at c) developed by the timer's oscillator or free-running square wave generator (not shown) are supplied at the timer's output terminal F.

The time interval between the timer sample pulses b is preferably adjustable over a relatively wide range such as 5 minutes to several hours and is usually selectively set to some suitable value depending upon the expected traffic volume and other factors. The frequency of the timer clock pulses c is much greater than that of the timer sample pulses b and may be of any suitable value.

As will be explained in greater detail shortly, each timer sample pulse is used as a command signal for initiating a data transfer cycle in which accumulated data is transferred from accumulator 17 to memory 20 by way of shift register 40. More specifically, the occurrence of a timer sample pulse causes the count accumulated in accumulator 17 to be transferred in parallel to shift register 40. From shift register 40 the data bits are then serially shifted into memory 20 in response to a one-word pulse signal d (FIG. 1) in which the number of bit-shifting pulses is equal to the number of register stages in shift register 40. The one-word generator 44 uses the timer's clock pulses c to generate the one-word pulse signal d.

Depending upon the condition of the pulses produced by transducer 12, a pulse conditioning circuit 52 may be employed and may include a Schmitt trigger (not shown) for squaring up the transducer's output pulse waveform and a monostable multivibrator (not shown) connected to the output of the Schmitt trigger for guaranteeing a fixed time duration for the transducer-produced pulses. The conditioned transducer pulses supplied by circuit 52 are counted in by accumulator 17 which may be a BCD counter of suitable type.

A suitable time delay and pulse conditioning circuit 54 is connected to the timer's output terminal K. Circuit 54 delays the timer sample pulse for a time interval that is sufficient to allow the system to settle down following reset action and before initiating the transfer of the data into memory 20.

The delayed timer sample pulses supplied by circuit 54 are indicated at b', and are applied to one input of the control circuit 49 and also to the axle miss detector 46. The axle miss detector 46 feeds a second input of the control circuit 49. The one word generator 44 feeds the third input of control circuit 49 as shown.

The digital signal at the output of logic circuit 49 is applied to the parallel-serial clock input of shift register 40. The parallel/serial enable input of shift register 40 is fed by the control circuit 50.

Shift register 40 has two operating modes, namely a parallel load mode and a serial shift mode. When register 40 is placed in its load mode, the plural bit word representing the accumulated count in accumulator 17 will be parallel loaded into register 40. When register 40 is in its shift mode, the bits in the register will be serially shifted through the register stages.

In the illustrated embodiment, the logic is such that shift register 40 will be parallel loaded by causing a low-to-high transition (a logic 0-to-logic 1 transition in this case) in the logic signal at the shift register's parallel-serial clock input while holding the shift register's parallel/serial enable input high and while applying the bits making up the word in accumulator 17 to the parallel inputs of the shift register.

To serially shift the bits in register 40, the register's parallel/serial enable input is held low (a logic 0) while feeding pulses to the register's parallel/serial clock input. With the shift register in its shift mode, each low-to-high transition in the pulse signal at the register's clock input shifts the data in the shift register one stage in a preselected direction.

Bringing the shift register's parallel/serial enable input high (a logic 1) inhibits serial shifting of the data through the register and enables the parallel loading of data. Bringing the shift register's enable input low inhibits its loading while enabling the serial shifting of the data.

The parallel/serial enable input for shift register 40 is fed by a one-shot multivibrator 57 (see FIG. 4). Multivibrator 57 forms a part of the control circuit 50 and is triggered by the positive going edge of each timer sample pulse b to produce a positive going pulse of preselected time duration. This positive going multivibrator pulse is applied to the parallel/serial enable input of shift register 40. At the beginning of each timer sample pulse b, the parallel/enable input of shift register 40 is therefore brought high and held high for a pre-selected time period.

Control circuit 49 may comprise any suitable logic circuit design for applying the desired positive-going pulse edge to the parallel-serial clock input of shift register 40. For example, control circuit 49 may comprise a NOR gate 58 and a pair of inverters 59 and 60 as shown in FIG. 4. Gate 58 and inverters 59 and 60 are all connected in series so that inverter 60 feeds the parallel-serial clock input of shift register 40.

For the illustrated logic, it will be appreciated that when all three inputs of NOR gate 58 are low at a logic 0, the parallel-serial clock input for shift register 40 will be high at a logic 1. If a positive-going pulse is applied to one or more of the inputs of NOR gate 58 a negative-going pulse will be applied to the parallel-serial clock input of shift register 40 to provide a positive-going transition. This positive-going pulse edge effectuates the parallel loading of shift register 40 or the serial shifting of the shift register's data depending upon the logic state of the shift register's parallel/serial enable input.

From the circuitry thus far described it will be appreciated that the parallel/serial enable input of shift register 40 is immediately brought high in response to the leading edge of each timer sample pulse b. Also in response to the leading edge of each timer sample pulse b, circuit 54 produces the delayed sample pulse b' which will be gated by NOR gate 58 to the parallel-serial clock input of shift register 40 while the shift register's parallel/serial enable input is high. As a result, the pulse count summed up by and accumulated in by accumulator 17 will be transferred in parallel to shift register 40.

Because of the asynchronous timing between timer 18 and transducer 12, it is possible for transducer 12 to generate an axle count pulse a at the beginning of the delayed timer sample pulse b'. If this happens, an axle count may be lost or the data loaded into register 40 may otherwise be incorrect. Detector 46 is connected to circuits 52 and 54 to sense this unwanted condition.

In the illustrated embodiment, the axle miss detector 46 comprises a NAND gate 62 and a monostable multivibrator 64 connected to the output of gate 62.

The transducer-produced axle count pulses a of appropriate polarity are fed to one input of NAND gate 62, and the delayed timer sample pulses b' are fed to the other input of NAND gate 62. The output of NAND gate 62 will be held high at a logic 1 as long as the two pulse signals at the NAND gate's inputs are not high at the same time. Under this condition, the output of multivibrator 64 will be held low at a logic 0.

If, however, a positive going transducer-produced axle count pulse a occurs at the same time that a positive going delayed timer sample pulse b' is present, a negative going pulse will be developed at the output of NAND gate 62. Multivibrator 64 will trigger on the trailing or positive going edge of this negative going pulse to produce a delayed positive going pulse b''.

The positive going edge of pulse b'' will occur a short time after the delayed timer sample pulse b' and consequently a short time after the shift register's parallel-serial input is brought high. The positive going transition of pulse b'' will therefore cause a second low-to-high transition at the parallel-serial clock input of shift register 40 a short time after the first positive going transition that was produced by the falling edge of the delayed timer sample pulse b'. This second positive going transition will occur while the shift register's parallel/serial enable input is still high. As a result, the contents of accumulator 17 will be transferred to shift register 40 a second time before accumulator 17 is reset to initiate a new counting cycle. The data loaded into shift register 40 will therefore be updated to provide an accurate count of the number of axles sensed by transducer 12.

After a time interval of about 3 ms the parallel/serial enable of shift register 40 is brought low by multivibrator 57 to place the shift register in its serial shift mode. This operation is effected by the completion of a positive going pulse at the output of multivibrator 57. The trailing edge of this positive going pulse also initiates the generation of the one-word data-shifting pulse signal d by generator 44. The one-word pulse signal d will therefore be applied to NOR gate 58 during the time in which the parallel-serial enable input of shift register 40 is low at a logic 0. As a result, each pulse in the one-word pulse signal d will serially shift the data bits in shift register 40 one stage in the proper direction for serially loading the bits into memory 20.

Any suitable circuit design may be employed for the one-word generator 44 and for the control circuitry used to initiate operation of generator 44. One suitable example of this circuitry is shown in FIG. 4 in which the control circuit 50 comprises a monostable multivibrator 66 and a flip flop 68 for initiating operation of the one-word generator 44. In this embodiment the one-word generator 44 is shown to comprise a pair of NAND gates 70 and 72, a binary up counter 74, a flip flop 76 and inverters 77–80.

The timer clock pulses c at terminal F of timer 18 are inverted by inverter 78 and applied to one input of gate 72. Upon being enabled gate 72 feeds the timer clock pulses to NOR gate 58 by way of inverter 80.

Gate 70 acts as the control element for gate 72 to enable gate 72 for a time interval that is just long enough to gate through a number of the timer's clock pulses equal to the number of bit-storing stages in shift register 40. Register 40 may have any suitable length such as 16 bits. For a 16-bit shift register gate 72 will be enabled just long enough to gate sixteen timer clock pulses to NOR gate 58.

Operation of gate 70 is under the control of flip flops 68 and 76, both of which may be of the JK type. Multivibrator 66 is connected to multivibrator 57 so that it will be triggered on the trailing edge of the positive going pulse which multivibrator 57 produced in response to each timer sample pulse b. Accordingly, as soon as the parallel/serial enable input of shift register 40 is brought low by multivibrator 57 following the transfer of data from accumulator 17 to shift register 40, the output of multivibrator 66 is brought high.

This output of multivibrator 66 is applied to the J input of flip flop 68 and the timer clock pulses c are applied to the flip flop's clock input. With this circuit arrangement the Q output of flip flop 68 is set high on the first positive going timer clock pulse c following the transition of the output of multivibrator 66 from its low to high state. The Q output of flip flop 68 is applied to one input of NAND gate 70.

The other input of NAND gate 70 is fed by the Q output of flip flop 76 by way of inverter 79. The Q output of flip flop 76 is normally low when the count in counter 74 is zero and remains low at a logic 0 until 16 pulses are counted in by counter 74.

The Q output of flip flop 76 will therefore be low at the start of each timer sample pulse b. This flip flop output is inverted by inverter 79 so that the associated input of gate 70 will be high at a logic 1 at the beginning of each timer sample pulse. Gate 70 is therefore placed in an enabling condition at the beginning of each timer sample pulse b.

Thus, when the output of flip flop 68 is brought high in the manner described above, the output of gate 70 will be brought low to a logic 0. This logic state will be inverted by inverter 77 to bring the enable input of counter 74 high. It will be appreciated that this condition occurs on the first rising edge in the timer clock pulse signal c following the instant at which the parallel/serial enable input of shift register 40 is brought low to change the operating condition of shift register 40 from its load mode to its serial shift mode. When the enable input of counter 74 is brought high by gate 70, the counter will be enabled to begin the count-in of the timer clock pulses c which are fed to the clock input of the counter by way of inverter 78.

As shown in FIG. 4 the timer clock pulses c are also fed to the clock input of flip flop 76. The data output connection of counter 74 to the J input of flip flop 76 is such that flip flop's J input is brought from low to high upon advancing the count in counter 74 to 15.

With these circuit connections the Q output of flip flop 76 will be held low at a logic 0 until the pulse count in counter 74 reaches 15. As a result, gate 70 will be in its enabled state. The output of gate 70 will therefore be brought low when the Q output of flip flop 68 is brought high. This output of gate 70 enables gate 72. As a result, timer clock pulses c will be gated through gate 72 to NOR gate 58.

As long as gate 72 remains in its enabled state timer clock pulses c will be fed to NOR gate 58. The positive going transition of each timer clock pulse c applied to the input of NOR gate 58 will result in a positive going transition at the parallel-serial clock input of shift register 40. Since gate 72 will be enabled only when the parallel/serial enable input of shift register 40 is low, then the application of the timer clock pulses c to NOR gate 58 will serially shift the data bits in register 40 out of the shift register and into memory 20 by way of the data input line 82.

Counter 74 keeps account of the number of bit-shifting timer clock pulses c by counting them as they are applied through gate 72 to NOR gate 58 for serially shifting the bits out of register 40. Upon counting in the 15th bit-shifting pulse in the train of pulses applied to gate 58, counter 74 brings the J input of flip flop 76 high. On the occurrence of the 16th bit-shifting pulse, therefore, the output of flip flop 76 will be brought high. This logic state will be inverted by inverter 79 to disable gate 70. As a result, the output of gate 70 will be brought high, causing the output of inverter 77 to go low to a logic 0. By bringing the output of inverter 77 low, gate 72 will be disabled and counter 74 will be reset to zero.

By disabling gate 72 the supply of timer clock pulses c to NOR gate 58 will be terminated. Since the disablement of gate 72 occurs on the count-in of the 16th timer clock pulse c by counter 74 the number of timer clock pulses applied to gate 58 for each timer sample pulse will be limited to sixteen. The sixteen data-shifting pulses at the input of NOR gate 58 will be just enough to serially transfer the 16 bit data word in register 40 to memory 20. This 16 bit word will be written into memory 20 at pre-selected addresses by application of appropriate logic states on the memory's write/enable and strobe lines which are respectfully indicated at 84 and 86 in FIG. 1.

The time duration for the positive going pulse produced by multivibrator 66 is adjusted so that it terminates with the count-in of the sixteenth counter clock pulse by counter 74. The J input of flip flop 68 is therefore brought low upon the count-in of the sixteenth timer clock pulse which makes up the last pulse in the data-shifting pulse signal d. On the occurrence of the next timer clock pulse the Q output of flip flop 68 will therefore be brought low.

By resetting counter 74 to zero on the count-in of the sixteenth timer clock pulse, the J input of flip flop 76 will be brought low. On the next timer clock pulse the Q output of flip flop 76 will consequently be brought low to re-apply the logic 1 enabling signal to gate 70. By this time, however, the Q output of flip flop 68 is low to hold the output of gate 70 high.

As a result, gate 72 will be held in its disabled state and counter 74 will be held in its reset state. Disabling gate 72 inhibits the transfer of the timer clock pulses c to the input of NOR gate 58. Placing counter 74 in its reset state prevents the counter from counting in timer clock pulses. Generator 44 and control circuit 50 are now in condition for producing a new data-shifting pulse signal d in response to the occurrence of the next timer sample pulse a.

Flip flop 76 has the effect of preventing the sixteenth clock pulse in the data-shifting digital signal d from becoming splintered. The sixteenth clock pulse in the data-shifting signal d will therefore be full size to ensure proper shifting operation of the bits in register 40.

A circuit connection indicated at 88 in FIGS. 1 and 4 is provided between counter 74 and the reset pin of accumulator 17 to reset accumulator 17 as soon as counter 74 reaches a count of eight. The output of counter 74 will be high between the eighth and sixteenth counts. Accumulator 17 will therefore be reset in the time interval following the parallel transfer of data to register 40 and before the circuit completes the transfer of data from register 40 to memory 20. Alternatively the circuitry may be designed to reset accumulator 17 as soon as counter 74 is enabled to begin the count-in for generating the sixteen bit data shifting signal.

In the illustrated embodiment memory 20 advantageously is of the single-plane type having a multitude of address locations for storing one-bit words. Each bit in the data word supplied by shift register 40 will therefore be stored at a different address location in memory 20.

For example, the bits in the sixteen-bit data word from register 40 may conveniently be written into the first sixteen address location 1 through 16 in memory 20 with one bit being stored at each address. The next data word transferred from accumulator 17 to register 40 will then be written into the sixteen succeeding addresses 17 through 32, and so on. The bits of each data word transferred from register 40 will therefore be stored at consecutive address locations in memory 20.

The foregoing type of memory has a number of advantages. First, it efficiently utilizes the available storage capacity. Second, the circuit design or memory architecture associated with such a one-plane memory is more simplified than the one for a plural plane memory.

Furthermore, with the simplified memory architecture of the illustrated embodiment, the one-word generator 44 is advantageously utilized to load the appropriate addresses into the memory's address counter 22 for writing in the axle count information.

The count which the address counter 22 is capable of generating is determined by the number of address locations or storage positions in memory 20. If, for example, there are 1,024 different address locations or one-bit memory cells or storage elements in the single plane memory 20, then an address of up to 1,024 must be made available by the address counter 22.

As shown in FIGS. 1 and 4, the output of the one-word generator 44 which is taken from inverter 80, is applied to the address counter 22 by way of line 95. Accordingly, the pulses in the one-word pulse signal d will be applied to counter 22 to advance the count in the counter.

When power is first applied to the data input and control unit 16 to initiate an information collection operation, the master clear and reset circuit 47 will operate to reset the address counter 22 to zero by way of reset line 90. At the time of the occurrence of the first timer sample pulse b from timer 18, the count in counter 22 will therefore be zero.

In response to the first timer sample pulse b, the first one-word pulse signal d will be generated by the one-word generator 44 for serially shifting the data bits into memory 20 from register 40. The first pulse in this first occurring pulse signal d will advance counter 22 to the count of 1. Accordingly, the first bit serially shifted out of register 40 will be stored in memory 20 at the address location corresponding to the numeral 1. Upon counting in the second pulse in the first-occurring pulse signal d, the count in counter will advance to 2. The second bit serially shifted out of register 40 will therefore be stored in memory 20 at the next address location corresponding to the numeral 2, and so on. Accordingly, by connecting the address counter 22 to count in the pulses in the one-word pulse signal d, the 16 bits of the first data word serially shifted out of register 40 will respectively be stored in order at the consecutive address locations 1 through 16 in memory 20.

In response to the second timer sample pulse b, which follows the first timer sample pulse after the elapse of the timer's selectively adjusted time interval, the second occurring one-word pulse signal d will be produced by the one-word generator 44. Address counter 22 will also count in the pulses in this second-occurring one-word signal d.

However, at the time that the second-occurring one-word pulse signal d occurrs the count in counter 22 will be at 16. Therefore, the count in the address counter 22 will be advanced to 17 upon counting in the first pulse in the second-occurring one-word pulse signal d. The first bit in the second data word loaded into register 40 will consequently be stored in the next address location 17. On the occurrence of the second pulse in the second-occurring one-word pulse signal d, the count in counter 22 will advance to 18. The second bit in the second data word will therefore be stored at the next address location 18, and so on.

Thus, the 16 bits in the second data word from register 40 will be stored in order at the memory's consecutive address locations starting with the address location 17 and ending with the address location 32. From this description it is apparent that the bits of the third data word from register 40 will be stored in order in the next 16 consecutive address locations in memory 20, starting with the address location 33 and ending with the address location 48. The one-word generator 44 thus operates as an incrementer for the address counter 22 to load consecutive addresses into the address counter.

The output of the one-word generator 44 is also connected to memory control circuit 42 whereby the operation of the memory control circuit 42 is placed under the control of the pulses in each of the one-word pulse signals d produced by generator 44 to synchronize the generation of the write/enable and strobe pulse signals with the addresses loaded into address counter 22. Memory control circuit 42 may be of any suitable circuit design for generating the write/enable and strobe signals at the proper times for writing in the serially applied data bits on line 82 at the proper address locations in memory 20. An example of a suitable circuit design for the memory control circuit 42 is shown in FIG. 4 to comprise three serially connected monostable multivibrators 92, 93 and 94.

Multivibrator 92 is triggered on the positive going or leading edge of each positive going pulse in the one-word generator's digital pulse signal d to produce a positive going strobe pulse which has a pre-selected duration and which is fed to the strobe input of memory 20 by way of the strobe line 86. The strobe pulse produced by multivibrator 92 is also applied to multivibrator 93.

Multivibrator 93 will be triggered on the negative going or trailing edge of the strobe pulse to produce a delayed negative going pulse. The leading edge of this delayed pulse will occur a short time after the leading edge of the positive going triggering pulse in the one-word pulse signal d. This delayed pulse is applied to trigger multivibrator 94. The connections are such that multivibrator 94 will produce the desired negative going write/enable pulse on the trailing edge of the delayed pulse from multivibrator 93. The write/enable pulse therefore occurs a short time after the completion of the strobe pulse, and the time interval between the strobe and write/enable pulses is equal to and set by the width of the delayed pulse from multivibrator 93.

One strobe pulse and one write/enable pulse will be generated in response to and during the interval of each timer clock pulse c in each of the one-word pulse signals d produced by the one-word generator 44. In response to each set of sequentially occurring strobe and write-/enable pulses, memory 20 will operate in the usual manner to write in the bit appearing at its data input terminal at the address location supplied by the address counter 22.

In addition to the circuitry thus far described the data input or control unit 16 may also include a digital display 100 for displaying the count accumulated in accumulator 17. To accomplish this the parallel output of accumulator 17 is connected by way of a conventional decoder and buffer circuit 102 to the digital display 100. A switch 104 may be provided for manually energizing the digital display 100. The assembly of the digital display 100, the decoder and buffer circuit 102 and switch 104 are advantageously housed in casing 34.

To facilitate the ready connection and disconnection of the removable memory pack 14 with respect to the data input and control unit 16 the component parts of pack 14—specifically memory 20, address counter 22 and battery 24—are advantageously mounted on a single card which is schematically indicated at 106 in FIG. 1. Additionally, a suitable connector unit or assembly 108 having a detachable, mating male and female connectors 110 and 112 is provided for establishing the necessary circuit connections between the memory pack 14 and the data input and control unit 16.

According to another advantageous feature of the illustrated embodiment the master reset circuit 47 is connected to be energized by battery 24 upon plugging the removable memory pack 14 into the data input and control unit 16 to clear counters 22 and 74 and flip flop 68 and 76. In the illustrated embodiment circuit 47 comprise a NAND gate 120, a pair of inverters 121 and 122 and a capacitor 124.

As shown, capacitor 124 and a resistor 126 are connected in series between the positive battery terminal $V_{cc}$ and earth ground. Inverters 121 and 122 are connected in series between the junction of capacitor 124 and resistor 126 and one input of NAND gate 120. The timer sample pulse at output terminal K of timer 18 feeds the other input of NAND gate 120. The output of NAND gate 120 in turn is connected to the clear terminals of flip flops 68 and 76 and counter 74 as shown in FIG. 4. The output of inverter 121 is connected to the reset terminal of counter 22.

Before plugging memory pack 14 into unit 16, capacitor 124 will normally be fully discharged so that both capacitor plates will be at ground potential. When pack 14 is first plugged into unit 16, the input to inverter 121 will therefore be low at 0 volt. As a result, the output of inverter 121 will initially be brought high to reset counter 22.

When the output of inverter 121 is brought high, the output of inverter 122 will be brought low. The output of NAND gate 120 will consequently be high to place flip flops 68 and 76 and counter 74 in their cleared states.

As soon as memory pack 14 is plugged into unit 16, battery 24 will begin to charge capacitor 124 through resistor 126. After a short time, sufficient positive voltage is built up by the capacitor charge to cause the output of inverter 121 to be pulled to its logic 0 state at zero volts, thus completing the reset pulse to counter 22. At the same time the output of inverter 122 will be brought high, but the output of NAND will remain high at a suitable positive voltage until timer 18 times out to produce a timer sample pulse b.

As soon as the timer sample pulse b is applied to gate 120, the output of gate 120 will be brought low to zero volts, thus conditioning flip flops 68 and 76 and counter 74 for operation in the manner previously described. Upon termination of the timer sample pulse, the output of gate 120 will be brought high again so that throughout the time interval between timer sample pulses flip flops 68 and 76 and counter 74 will be held in their cleared states.

From the foregoing description it will be appreciated that components in pack 14 and unit 16 will automatically be reset or cleared in foolproof manner simply by plugging pack 14 into unit 16. This eliminates the need for manually resetting or clearing these components before operation.

Preliminary to operation of system 10 unit 35 is located at a selected roadway site and the timer 18 is adjusted to provide the desired frequency of the timer sample pulses b. The memory pack 14 is then connected or plugged into the data input and control unit 16 to apply power to the circuits in unit 16.

At the moment memory pack 14 is plugged into unit 16, the master reset circuit 47 will operate in the manner previously described to clear or reset flip flops 68 and 76 and counters 74 and 22.

Upon applying power to timer 18, the timer will begin timing the first counting or timer sample pulse period in which the pulses a generated by transducer 12 are counted in by accumulator 17. As an example, assume that ten transducer pulses a are generated in the first counting period. A count of 10 will therefore be accumulated in accumulator 17 prior to the generation of the first timer sample pulse b.

When timer 18 times out for the first time to generate the first timer sample pulse b, the count of 10 in its BCD form will be loaded into shift register 40 in the manner previously described. If the axle detector 46 detects coincidence between the delayed timer sample pulse b' and one of the transducer-produced pulses a, it will cause a second transfer of the data from accumulator 17 to shift register 40 to update the count in register 40.

Immediately following the parallel loading operation of register 40, accumulator 17 is reset to zero and generator 44 will be conditioned by control circuit 50 to begin the generation of the first one-word pulse signal d. Thus, while accumulator 17 is counting in the transducer-produced pulses a in the second counting period following the resetting of the accumulator, the data bits in shift register 40 are being serially shifted out of register 40 and written into memory 20. By virtue of the foregoing operation, the BCD word representing the count of 10 will be stored at the first 16 consecutive address locations corresponding to the numerals 1 through 16.

Assume now, as an example, that transducer 12 produces 15 pulses during the second counting period. The count in accumulator 17 will therefore be advanced to 15. Thus, when timer 18 times out the second time to generate the second timer sample pulse b, the foregoing operations will be repeated to first load the count of 15 into shift register 40 and then to serially shift the bits of the BCD word representing the count of 15 into memory 20 where they will be stored in order at the next 16 consecutive address locations corresponding to the numerals 17 through 32. Thus at the end of the second counting period the counts of 10 and 15 will non-cumulatively be stored in the memory 20 in the form of two separate BCD words.

From the foregoing operation of system 10 is will be appreciated that the system operates to write into memory 20 the number of transducer-produced pulses that were counted in each recurring timer sample pulse period and further operates to non-cumulatively preserve the count produced in each timer sample pulse period. Additionally, system 10 operates to accumulate the count ocurring in each of successively occurring time periods of equal durations and to periodically transfer the accumulated count at the end of each time period into memory 20 while continuing to accumulate the count in the next ensuing time period.

After the desired information is stored in memory 20, memory pack 14 is removed from system by unplugging it from unit 16. Memory pack 14 then may be transported under the power furnished by battery 24 to some remote location such as station 19 without loss of the information written into memory 20. Because of the previously described construction of memory pack 20, it is small enough to be portable and hand carried so that it can conveniently be transported from one location to another.

A data processor or translator 130 (see FIG. 3) may be located at station 19 for reading out the data stored in memory 20. The read-out may be accomplished in any suitable way.

In the illustrated embodiment, pack 14 is conveniently pluggable into translator 130 to provide the necessary connections to the memory's data output terminal 27, the strobe and enable terminals and the address counter input and reset lines or terminals 132 and 133 (see FIG. 1) for counter 22. Memory 20 may be addressed for reading out the stored data by advancing the count in counter 22.

To accomplish this, translator 130 may be equipped with a pulse generator (not shown) which is connectable to line 132 through connector 112 to apply a train of pulses for incrementing or advancing the count in the address counter 22 one count at a time. In this manner the various bit-storing address locations in memory 20 are addressed in the consecutive order to provide for the serial read-out of the stored data words on the data output line 27 upon applying the appropriate digital signal states to the enable and strobe lines 28 and 29. Generation of the enable and strobe signals on lines 28 and 29 in synchronism with the counter-incrementing pulses on line 132 may be accomplished by any suitable circuit design in translator 130. Alternatively, the advancement of the count in address counter 22 and application of the appropriate electrical signal states to lines 28 and 29 may be accomplished selectively or manually to effectuate the read-out of the data stored in memory 20. The data read out on line 27 may be fed to a suitable read-out device (e.g., a digital display or printer) to indicate the numerical value of each binary word. This read-out device may form a part of translator 130.

Translator 130 may conveniently be equipped with its own power source which may be connected to battery 24 through connector 112 for recharging the battery.

As shown in FIG. 1, a common or d.c. ground 150 is provided in memory pack 20 for battery 24 and the circuits in pack 20. The negative terminal of battery 24 is connected to ground 150.

The terminals marked GRD for timer 18 and the various circuits in the data input and control unit 16 advantageously are all connected in parallel through connector assembly 108 to ground 150 in pack 14 in the manner shown to complete the circuit connections for feeding current from battery 24. It will be appreciated that ground 150 is not at earth potential. when pack 14 is plugged into unit 16, therefore, each pair of lines marked $V_{cc}$ and GRD in unit 16 will be hot. It further will be appreciated that the circuit design could be such to provide an earth ground instead of the d.c. ground 150.

As shown in FIG. 1, resistors 136, 137, 138 and 139 are each connected at one end to ground 150 in pack 14. The other ends of resistors 136-139 are respectively connected to the positive side of battery 24. The other ends of resistors 140 and 141 are connected to terminals 26 and 27, respectively. Upon unplugging pack 14 from unit 16, resistors 136-139 are sized to clamp terminals 28, 29, 132, and 133 to potential at ground 150 and resistors 140 and 141 are sized to clamp terminals 26 and 27 to the positive battery voltage. Resistors 136-141 are preferably large enough (e.g. 100 KΩ) to limit current flow and to thereby cause no more than a negligible current drain on battery 24.

This network of resistors 136-141 prevents stray inputs or transients from changing the stored binary states in memory 20 or the count in counter 22 when the memory pack is in transit or in the course of plugging pack 14 into unit 16 or unplugging it from unit 16.

By virtue of using address counter 22 to furnish the address instructions to memory 20 and by virtue of making it a part of the removable memory pack 14, the number of physical circuit connections required between the circuit in memory pack 14 and the circuitry outboard of pack 14 is minimized. Thus, the relative small number of physical circuit connections needed between pack 14 and the outboard circuitry enhances the reliability of system 10.

Because battery 24 is of the rechargeable type, solar cells (not shown) may be connected to the battery to recharge the battery when additional power is needed. This would greatly extend the operative use of the battery to several years. With such a solar cell charging arrangement the recording machine of this invention may be placed in remote locations of the world for long, unattended periods and may be interrogated by satellites circling in space.

Figure 5:
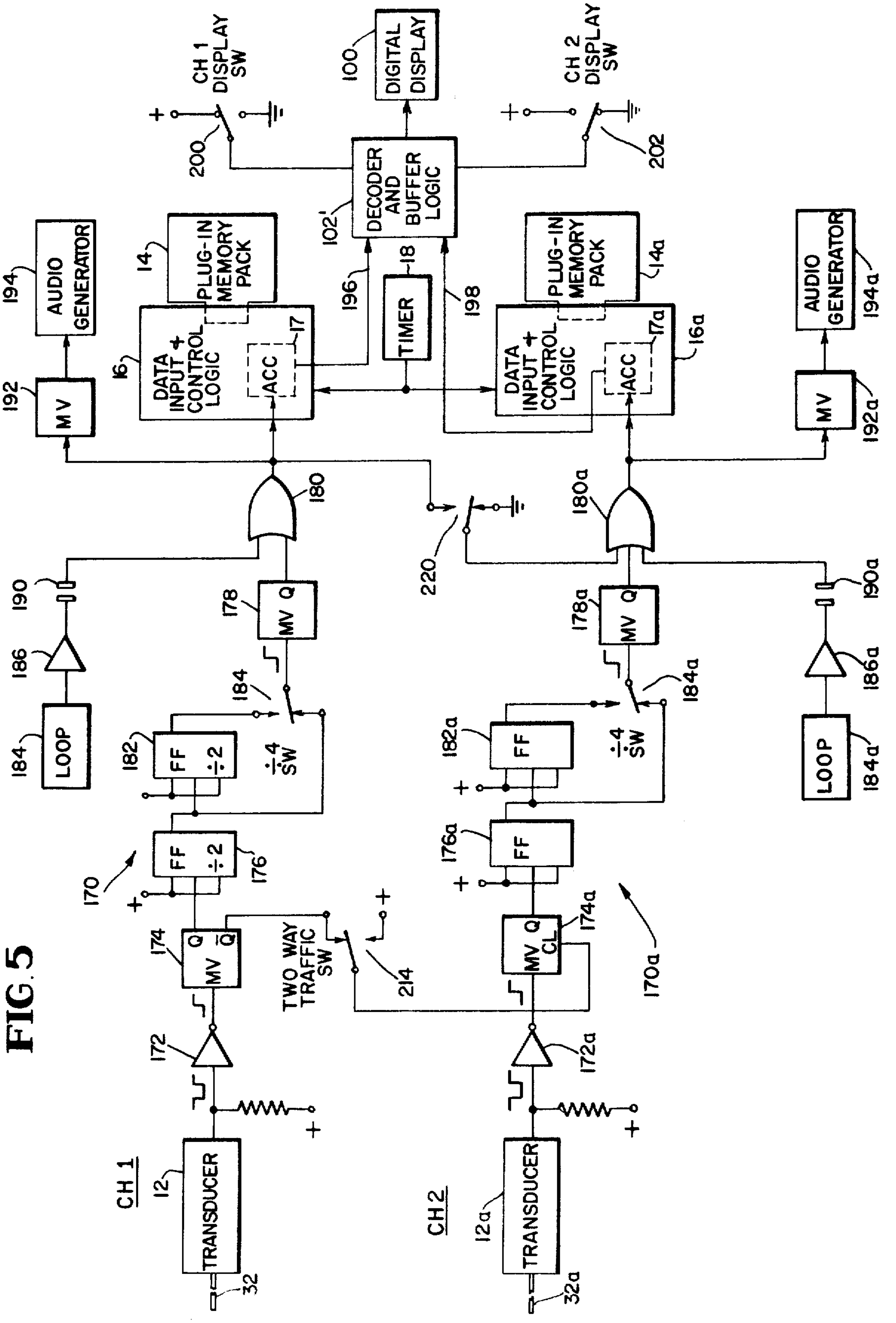
FIG. 5 is a schematic diagram of a dual channel information collection and storage incorporating various principles of this invention.

Instead of the single channel arrangement shown in FIGS. 1 and 2, the information recording system of this invention may be equipped with two signal channels, such as channels 1 and 2, to provide a dual channel arrangement as shown in FIG. 5. This dual channel system has two separate inputs and two separate outputs for recording two-directional traffic and enables simultaneous dual recording. Two-directional traffic is considered to be two separate paths of vehicular traffic each travelling in any given direction such as north and east, in opposite directions (e.g., north and south) or in a common direction (e.g., both north).

As shown in FIG. 5, the first channel, channel 1, includes transducer 12, the selectively removable memory and battery pack 14, and the digital data input and control circuit 16, all as previously described. Additionally, channel 1 comprises a signal conditioning and format control circuit 170 connected between transducer 12 and the data input and control circuit 16.

The data input and control circuit 16 in FIG. 5 is considered to mainly comprise accumulator 17, shift register 40, multivibrator 54, axle miss detector 46, the shift register clock control logic 49, the control logic 50, the one word generator 44, the memory control 42 and the master clear circuit 47 all connected in the manner shown in FIG. 1 to operate in the fashion previously explained for the embodiment of FIGS. 1-4.

The second channel, channel 2, is preferably the same as channel 1 described above. Accordingly, like reference numerals have been applied to designate like circuits and componentry for the two channels except that the reference numerals applied to identify the parts of channel 2 have been suffixed by the letter a to distinguish them from the reference numerals used for the parts of channel 1.

In the dual channel embodiment shown in FIG. 5 the previously described timer 18 and digital display unit 100 are common to channels 1 and 2. Also common to both channels is a dual channel decoder and buffer logic circuit 102' for driving the digital display unit 100.

In the embodiment shown in FIG. 5 circuit 170 comprises a suitable pulse conditioning means such as a Schmidt trigger 172 feeding a one shot multivibrator 174. The output of transducer 12 is applied to the input of Schmidt trigger 174, thus developing properly shaped pulses at the output of multivibrator 174. Multivibrator 174 sets the pulse widths to a suitable, uniform, pre-selected value.

Like the preceding embodiment the pneumatic road tube 32 constitutes the input or sensing device for transducer 12 to cause transducer 12 to generate an electrical pulse for each vehicle axle passing over the tube. The number of pulses at the output of multivibrator 174 will therefore be equal to the number of axles passing over road tube 32, thus providing an axle count.

To furnish a vehicle count from the axle count circuit 170 is equipped with a flip flop 176 which is connected as a divide-by-two counter in the manner shown. The Q output of multivibrator 174 feeds the center trip of flip flop 176, whereby one pulse is produced at the Q output of flip flop 176 every two pulses arriving at the flip flop's center trip. Accordingly, the number of pulses at the Q output of flip flop 176 represents the number of dual axle vehicles passing over road tube 32.

Circuit 170 may be equipped with an additional divide-by-two flip flop 182 and a selector switch 184 for optionally dividing the number of axle counts by four. As will be described in greater detail shortly, flip flop 182 is placed in the active circuit by operation of switch 184 to provide a vehicle count in situations where road tube 32 is placed at least partially across a curved road section of relatively short radius such as an exit or entrance ramp.

As shown in FIG. 5, the Q output of flip flop 176 is connected to the center trip of flip flop 182 and also to one of the stationary contacts of switch 184. The Q output of flip flop 182 is connected to the other stationary contact of switch 184, and the movable switch element of switch 184 is connected to the input of a one-shot multivibrator 178 which sets the pulse width for count-in by accumulator 17. The output of multivibrator 178 feeds one input of an OR gate 180. The other input of OR gate 180 is used for an alternate signal input such as an inductive loop input as will be described in detail later on. The pulses at the output of gate 180 are fed to accumulator 17 for count in.

When switch 184 is in its illustrated position flip flop 182 will be disconnected from the active circuit and the pulse output of flip flop 176 will be fed directly into multivibrator 178 such that the number of pulses fed from OR gate 180 to accumulator 17 will be one-half the number of pulses at the output of multivibrator 174. When switch 184 is set to its alternate position the output of flip flop 182 will be connected to the input of multivibrator 178 in place of flip flop 176. Flip flop 182 operates to divide the pulses from flip flop 176 by two such that the number of pulses at the output of flip flop 182 will be equal to the number of pulses supplied by multivibrator 174 divided by four. Hence, only one pulse will be fed to and counted in by accumulator 17 for every four pulses produced by multivibrator 174 when switch 184 is in its alternate unillustrated position.

In the example shown in FIG. 5, a suitable vehicle-sensing inductive loop 184 and a loop amplifier 186 may be employed in place of transducer 12 and road tube 32. To accomplish this the output of amplifier 186 is selectively connected or plugged into the second input or OR gate 180 by suitable means such as a plug type connector 190, and road tube 32 is removed from the roadway. When road tube 32 is placed across the roadway to sense vehicle traffic it will be appreciated that the loop amplifier 186 will be electrically disconnected from OR gate 180 and therefore will not serve to supply an input to gate 180 when transducer 12 is in use. Depending upon the particular vehicle sensing loop that is used, a suitable interface (not shown) may be required and may be connected between connector 190 and gate 180.

Still referring to FIG. 5, the output of gate 180 may optionally be connected by way of a further one shot multivibrator 192 to a sound-producing audio generator 194. Multivibrator 192 sets the pulse width for driving generator 194. Generator 194 is responsive to the pulse supplied by multivibrator 192 to emit an audible sound such as a beep. With this circuit arrangement it will be appreciated that generator 194 will emit a separate audible sound for each vehicle count pulse supplied at the output of gate 180. Generator 194 may be turned on and off by any suitable means such as a manual switch (not shown) in the generator itself.

Since the data input and control circuits 16 and 16*a* are the same, like reference numerals have been applied to designate like parts of the two circuits except that the reference numerals designating the different parts of circuit 16*a* have been suffixed by the latter a to distinguish them from the reference numerals used for the different parts in the data input and control circuit 16.

As shown, the output of accumulators 17 and 17*a* are connected to separate input signal channels 196 and 198 of the decoder and buffer logic circuit 102'. The two input channels of circuit 102' feed a common output which is connected to the digital display unit 100.

A selector switch 200 is connected to the decoder and buffer circuit 102' for selectively enabling and inhibiting the decoder and buffer input channel 196 for channel 1. An additional switch 202 is connected to the decoder and buffer circuit 102' for selectively enabling and inhibiting the decoder and buffer's input channel 198 which is associated with channel 2.

When switches 200 and 202 are in their illustrated positions input channel 196 will be enabled and input channel 198 will be inhibited. As a result, the pulse count in accumulator 17 will be applied to the digital display unit 100 for visual display. When switches 200 and 202 are set to their alternate unshown positions input channel 196 will be inhibited and input channel 198 will be enabled, thereby providing for the visual display of the count accumulated in accumulator 17*a* instead of the count in accumulator 17.

It will be appreciated that any decoder and buffer circuit design may be utilized for circuit 102' to accomplish the foregoing enabling and inhibiting operations under the operation of switches 200 and 202.

Still referring to FIG. 5, circuit 170*a* is the same as circuit 170. Accordingly, like reference numerals have been applied to designate like parts of the two circuits except that the reference numerals applied to designate the different parts of circuit 170*a* have been suffixed by the letter a to distinguish them from the reference numerals used for circuit 170.

When switches 200 and 202 are placed in their illustrated positions operation of channel 1 may be checked by the person operating the system as vehicles pass over road tube 32 by listening for the audible sound emitted by generator 194 and at the same time observing the advancement of the count displayed by the display unit 100. If the channel 1 is operating satisfactorily each sound emitted by the audio generator 194 will coincide with the advancement of one count on the display of unit 100. Operation of channel 2 may be checked in the same way by setting switches 200 and 202 to their alternate, unshown positions and by listening for the audible sound emitted by the generator 194*a* while at the same time observing the count registered by the digital display unit 100.

For recording two-way traffic (i.e., traffic travelling in opposite directions such as north and south) and dual lane traffic travelling in a common direction, road tube 32 may be made sufficiently short so that it extends partially across only one traffic lane 210 (see FIGS. 6 and 7) and road tube 32*a* is made sufficiently long to extend completely across the first lane 210 and at least partially across the second lane 212, all as shown in FIGS. 6 and 7. With this arrangement, vehicles travelling in lane 210 will pass over both of the road tubes 32 and 32*a*. As a result both of the transducers 12 and 12*a* will produce a pulse for each axle passing over their respective road tubes. The unwanted traffic count pulses produced by transducer 12*a* by traffic travelling in line 210 are rejected or eliminated by setting a selector switch 214 to its position shown in FIG. 5.

The direction of traffic movement for the two arrangements of road tubes 32 and 32*a* in FIGS. 6 and 7 is illustrated by arrows in the traffic lanes 210 and 212. For these applications road tubes 32 and 32*a* are positioned in side-by-side parallel relationship with each other preferably in contact with each other or at least very close to each other. Additionally, road tube 32 is positioned ahead of road tube 32*a* in the direction of traffic travel so that it will be actuated before road tube 32*a*, thus causing the axle count pulse to occur in channel 1 before the axle count pulse occurs in channel 2.

As shown, one stationary contact of switch 214 is connected to the $\bar{Q}$ output of multivibrator 174, and the other stationary contact of the switch is connected to the positive terminal of the previously described d.c. battery source. The movable switch element of switch 214 is connected to the clear terminal of multivibrator 174*a*.

When switch 214 is set to its illustrated position, each negative going pulse at the $\bar{Q}$ output of multivibrator 174 will be applied to the clear terminal of multivibrator 174*a*. Multivibrator 174*a* will therefore be inhibited for the duration of each negative going pulse at the $\bar{Q}$ output of multivibrator 174.

When switch 214 is set to its alternate unshown position where its movable contact element connects the positive battery to the clear terminal of multivibrator 174*a*, multivibrator 174*a* will be enabled independently of the multivibrator output in channel 1 and will therefore be triggered by the leading edge of each incoming pulse to produce an output pulse which is fed to flip flop 176*a*. Thus, channel 2 will operate independently of channel 1 when switch 214 is set to its alternate, unshown position.

In operation of the dual channel system thus far described it will be appreciated that switch 214 will be placed in its illustrated position for situations where the longer road tube 32*a* extends across the lane in which road tube 32 is placed for actuation by vehicles travelling along the lane in which road tube 32 lies. Switch 214 will therefore be set to its illustrated position for the two situations shown in FIGS. 6 and 7 in order to provide an accurate count of traffic flowing in lanes 210 and 212.

In response to the rising edge of each axle-representing pulse at its input, multivibrator 174 simultaneously produces a positive going pulse at its Q output and a negative going pulse at its $\bar{Q}$ output. When switch 214 is in its illustrated position, therefore, a negative going pulse will therefore be applied to multivibrator 174*a* to momentarily inhibit the multivibrator. Since road tube 32 is positioned ahead of road tube 32*a* in the direction of traffic travel, multivibrator 174*a* will be inhibited before the arrival of an axle-representing pulse for the passage of a given axle successively over road tubes 32 and 32*a*. The unwanted axle-representing pulse arriving at the input of multivibrator 174*a* will therefore be rejected and will not be transmitted to flip flop 176*a*.

For the application shown in FIGS. 6 and 7, road tubes 32 and 32*a* are preferably clamped in place by suitable means such as clamps or brackets 216 to keep them from moving apart. Brackets 216 may be anchored to the roadway by any suitable fastener means. It will be appreciated that the separate road tubes may be replaced by one molded twin tube (not shown) having two integrally interconnected side-by-side tubular sections for the traffic counting applications shown in FIGS. 6 and 7.

A traffic pattern in which it is desirous to maintain multivibrator 174*a* continuously in its enabled state is illustrated in FIG. 8 wherein a north-south road is shown to intersect an east-west road. In this example, road tube 32 is placed partially across the lane carrying traffic in the east direction and road tube 32*a* is placed across the lane carrying traffic in the south direction. For such an arrangement switch 214 is set to its alternate unshown position for maintaining multivibrator 174*a* in its enabled state independently of pulses supplied at the output of multivibrator 174. As a result every vehicle passing over road tube 32*a* will be counted in.

The dual channel arrangement shown in FIG. 5 may also be equipped with a summator switch 220 for counting in and storing the sum of the pulse counts at the outputs of both of the gates 180 and 180*a* in memory pack 14*a*. One of the stationary contacts of the summator switch is connected to the output of gate 180 and the other stationary contact of the summator switch is grounded. The movable contact element of switch 220 is connected to a third input of gate 180*a*.

When switch 220 is in its illustrated position the output of gate 180 will be disconnected from the input of gate 180*a*. As a result, the vehicle count pulses at the output of gate 180 will be accumulated in accumulator 17, but not accumulator 17*a*. The vehicle pulse count transmitted by channel 1 will therefore be fed into and stored in the removable memory pack 14 but not in the removable memory pack 14*a*. Vehicle count pulses at the output of gate 180*a* will be accumulated in accumulator 17*a* but not in accumulator 17. The vehicle count transmitted by channel 2 will therefore be stored in memory pack 14*a* but not memory pack 14.

When switch 220 is set to its alternate unshown position to connect the output of 180 to gate 180*a*, the vehicle count pulses at the output of gate 180 will be fed to and counted in by accumulator 17*a* as well as accumulator 17. Accumulator 17*a* will therefore count in the pulses from both channels to thus sum the two vehicle counts from channels 1 and 2. The summation of the two vehicle counts from channels 1 and 2 will therefore be stored in memory pack 14*a*. For either position of switch 220, memory pack 14 will only store the vehicle pulse count from channel 1.

Referring to FIG. 9 road tube 32 is shown to extend at least partially across a curved road section of sufficiently small radius that transducer 12 will produced four pulses for the passage of a dual axle vehicle over the road tube. For such an application switch 184 is set to its alternate unshown position where the output of flip flop 182 is connected to the input of multivibrator 178 in place of flip flop 176. One pulse will therefore be fed to the input of multivibrator 178 for every four pulses supplied at the output of multivibrator 174. Thus, one vehicle count will be stored in accumulator 17 for every four pulses supplied by transducer 12 to establish an accurate count of the number of vehicles passing over road tube 32. Switch 184*a* is used in the same manner when it is desired to divide the pulse output of transducer 12*a* by four.

It will be appreciated that the information recording system of this invention may be equipped with three or more signal channels, each having its own input and output for storing the digital information in a separate removable memory pack.

In practice, there exists the possibility for various types of failures in the course of using the information recording systems shown in FIGS. 1–5. For example, malfunctions may be attributable to permenant or temporary disconnection of road tube 32 from transducer 12, damage to road tube 32 to render it ineffective to produce adequate air pressure for driving transducer 12, failure of the loop amplifier 186, or failure of the inductive loop 184 to sense passing vehicles. When anyone of these malfunctions occurs it is apparent that no traffic count will be recorded, and the defect may not be detected until the data in the memory pack 14 is read out at the central processing station after the traffic counting operation has been completed. As a result, valuable time and traffic information may be lost.

To avoid the potential problems outlined above the single channel embodiment of FIGS. 1 and 2 and also the dual channel embodiment of FIG. 5 may optionally be equipped with a detector 320 (see FIG. 10) for sensing or detecting the failure of the recording system to record traffic counts by recording the maximum elapsed time, as in terms of hours, in which no traffic counts were recorded. To accomplish this function, detector 230 is shown to mainly comprise a programable divide by N counter 232, a 4-bit counter 234, a four bit magnitude comparator 236, a four bit quad type latch 238, a suitable logic gate and multivibrator circuit 240, and a visual display unit 242. In the illustrated embodiment the logic circuit 240 comprises OR gates 244, 245 and 246, AND gate 247 and a NAND gate 248 as well as a pair of one-shot multivibrators 249 and 250.

When detector 230 is used with one of the signal channels shown in FIG. 5, such as channel 1, it may be connected into the signal channel at any suitable place such as the output of gate 180. Vehicle count pulses at the output of gate 180 will therefore be fed to an input of detector 230.

By connecting detector 230 to the output of gate 180 the detector will monitor the operation of road tube 32 and transducer 12 as well as all of the circuitry between the transducer and gate 180. It will also monitor loop 184 and loop amplifier 186 when the inductive loop and loop amplifier are connected to the input of gate 180 for use in place of road tube 32 and transducer 12.

As shown, the K output of timer 18 is connected to counter 232 to advance or step the counter. Counter 232 is programmed to produce one output pulse each time it counts in a pre-selected number of the timer pulses. In this embodiment counter 232 is programmed to supply one output pulse per hour or one output pulse for every twelve timer output pulses where the period of the timer output pulses is five minutes. For this embodiment, therefore, the time period represented by the display on unit 242 will be in hours.

The time unit pulses supplied at the output of counter 232 are fed to counter 234 for count-in when counter 234 is enabled. Being of the 4-bit type, counter 234 will count up to decimal 15. Upon reaching this maximum count, counter 234 will be inhibited by operation of NAND gate 248.

Logic circuit 240 resets counter 234 in response to the occurrence of any one of three signals, namely the vehicle count pulse signal at the output of gate 180, the master reset pulse signal from the master reset circuit 47, and a selectively generated reset pulse signal produced by the closure of a reset switch 252.

Figure 10:
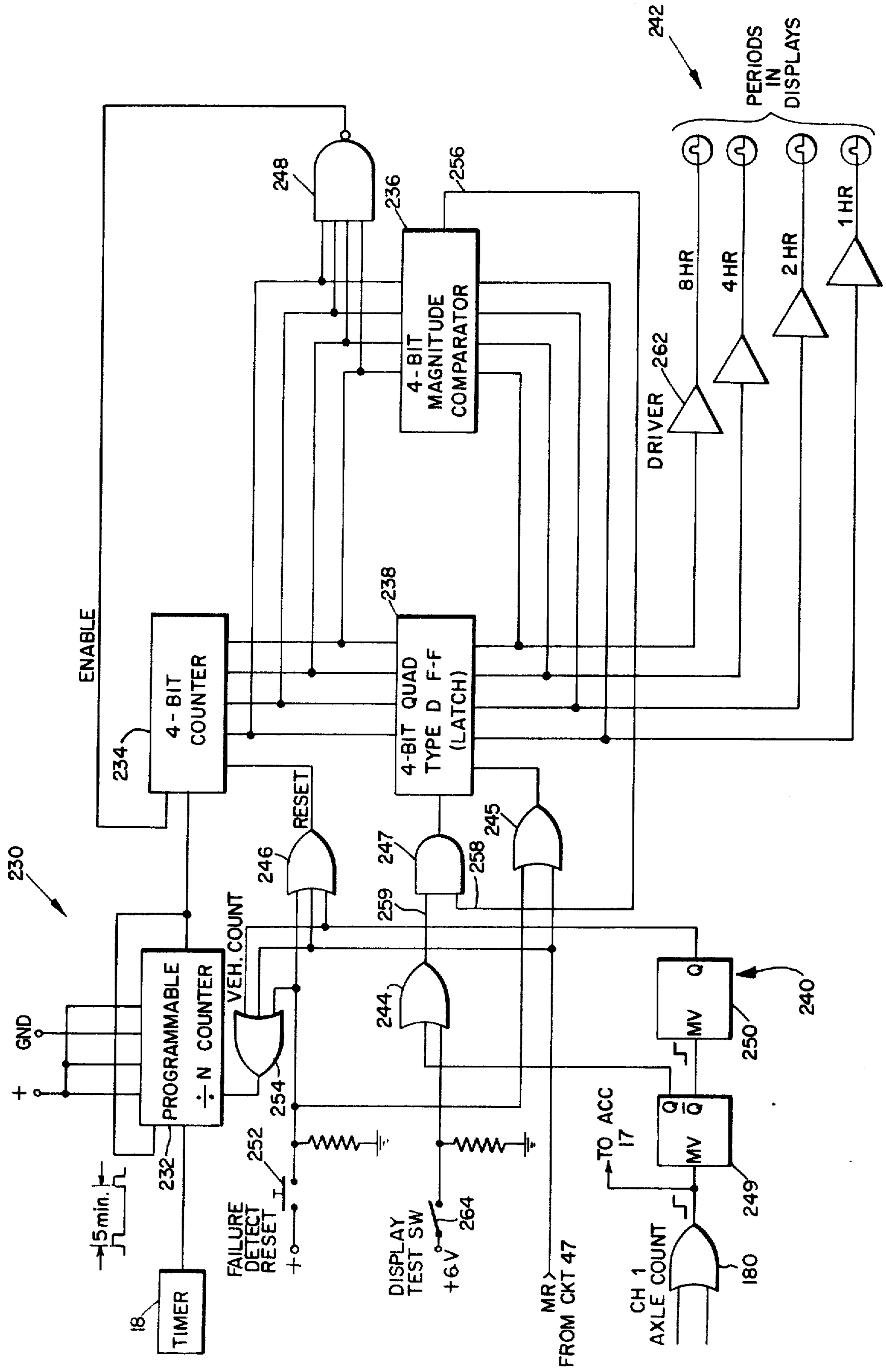
FIG. 10 is a schematic diagram of a detector circuit for indicating the maximum number of hours that elapse without sensing any traffic.

As shown in FIG. 10, the output of gate 180 is connected to multivibrator 249 to trigger the multivibrator. The $\overline{Q}$ output of multivibrator 249 is connected to multivibrator 250, and the Q output of multivibrator 250, in turn, is connected to one input of OR gate 246. The output of gate 246 is connected to the reset terminal of counter 234. Whenever the output of gate 246 is brought high counter 234 will be reset.

In addition to being connected to multivibrator 249, the output of gate 180 is connected to another OR gate 254 or other suitable logic to reset counter 232 when counter 234 is reset. Gates 246 and 254 are also connected to the master reset circuit 47 so that both counters 232 and 234 are reset to zero upon plugging the removable battery pack 14 into the data input and control circit 16. Switch 252 is also connected to gates 246 and 254, whereby momentary closure of the reset switch also resets counters 232 and 234.

The 4-bit parallel output of counter 234 is applied to NAND gate 248. The output of NAND gate 248 feeds the enable input of counter 234. Counter 234 will therefore remain enabled until it reaches the count of 15. When this happens the output of gate 248 goes low to inhibit the counter and thereby prevent it from returning to all 0's upon the arrival of the next count. Counter 234 will therefore be locked up by gate 248 upon reaching its maximum count of 15.

During the traffic-counting operation of the recording system counter 234 will therefore count in the hour-representing pulses from counter 232 until it either reaches the maximum count of 15 hours or it is reset before reaching the maximum count by the occurrence of a vehicle count pulse at the output of gate 180. When reset occurs the count in counter 234 will be restored to 0 and the counter will then begin counting anew from the occurrence of the last vehicle count pulse. Accordingly, the number of counts in counter 234 represents the number of hours that have elapsed following the occurrence of the last vehicle count pulse at the output of gate 180.

Still referring to FIG. 10, the four stages of counter 234 are connected in parallel to the separate flip flop stages in latch 238 and also in parallel to one input side of comparator 236. The parallel output terminals of latch 238 are applied in parallel to the other input side of comparator 236 for comparison with the parallel output of counter 232.

As shown, the output of gate 247 is connected to the enable input of latch 238, and the comparator output 256 feeds input 258 of gate 247. The other input of gate 247, indicated at 259, is fed by OR gate 244. One of the two inputs of gate 244 is fed by the Q output of multivibrator 249. When the output of gate 247 goes high latch 238 will be enabled thus transferring the count in counter 234 in parallel into latch 238. When this happens it will be appreciated that the count transferred from counter 234 will be stored in and memorized by latch 238.

From the foregoing description it is apparent that comparator 236 continuously compares the count in counter 234 with the count stored in latch 238. When the count in counter 234 is equal to or less than the count stored in latch 238 the comparator output 256 will be low at zero volts. The enable input of latch 238 therefore is low to inhibit the transfer of the contents in counter 234 to latch 238.

When the count in counter 234 becomes higher than the count in latch 238, the comparator output 256 will be brought high to some suitable voltage value (e.g., +5 volts), thus making the AND gate input 258 high. However, the enable input of latch 238 will not be brought high for transferring the contents in counter 234 to latch 238 until the output of OR gate 244 is brought high.

The output of OR gate 244 will be brought high when a positive going vehicle count pulse occurs and is gated through gate 180 to multivibrator 249, thus triggering the latter. If AND gate input 258 is high at this time, then the enable input of latch 238 will be brought high, placing the latch in its load mode to transfer the contents in counter 234 for storage in the latch. The vehicle count pulses at the output of gate 180 therefore have the effect of sampling the logic state of the comparator output 256.

Each time counter 234 is advanced by one, it will exceed the count in latch 238. Comparator 236 will sense this condition and will therefore enable latch 238 to cause the higher count in counter 234 to be transferred into latch 238 when a vehicle count pulses occurs at the output of gate 180. The count stored in latch 238 will remain memorized in the latch even though counter 234 is reset to zero by the occurrence of the vehicle count pulse at the output of the gate 180. Accordingly, the count in latch 238 represents the maximum number of hours that occurred between successively occurring vehicle count pulses at the output of gate 180. The count in latch 238 therefore represents the maximum number of hours that went by without passage of traffic over road tube 32 or loop 184 in the case where the inductive loop is connected into the channel for use in place of the road tube.

In considering the part of detector 230 thus far described, assume that the first vehicle passes over road tube 32 more than one hour but less than two hours after the recording system of this invention is placed in operation. As a result a count of 1 will be registered in counter 234 and will exceed the zero count in latch 238. The output of comparator 236 will therefore go high, causing the transfer of the 1 count into latch 238 upon the occurrence of the first vehicle count pulse.

If two hours elapse without traffic after the first vehicle passes over road tube 32 then the count in counter 234 will be advanced to two. When this happens, comparator 236 will enable latch 238 on the occurrence of the second vehicle count pulse, thereby causing the transfer of the count of 2 into the latch 238. The transfer of the new data into latch 238 erases the old data which was originally in the latch. At this stage, therefore, a count of 2 will be stored in latch 238. In this manner, it is clear that latch 238 stores or memorizes the maximum number of hours in which no traffic is sensed.

As shown in FIG. 10, the parallel outputs of latch 239 are fed to separate display lights of display unit 242 through suitable drivers 262. The four display lights of unit 242 will therefore display the number of hours in latch 238 in binary form.

When none of the display lights in unit 242 is illuminated, one of two conditions may exist. The first is that the maximum time between successively occurring vehicle counts did not exceed one hour. The second condition is where no vehicles at all were detected from the moment the recording system was placed in operation. Under this latter condition, some count will usually be stored in counter 234 to indicate the number of hours without traffic up to the maximum of 15 hours. To effectuate a read-out of the count stored in counter 234 for this condition a switch 264 is connected to the second input of gate 244 and is selectively actuatable to a closed position to apply positive voltage to the OR gate.

Since the count in counter 234 exceeds the counts in latch 238 and NAND gate input 258 will be high at the time switch 264 is closed. The output of NAND gate 247 will therefore be driven high by the closure of switch 264, causing a transfer of the contents in counter 234 into latch 238 for display by the display lights in unit 242.

Switch 252 and the master clear circuit 47 are connected to separate inputs of OR gate 245, and the output of gate 245 is connected to the reset of latch 238. Operation of switch 252 or generation of a reset pulse by the master reset circuit 47 therefore results in the resetting of latch 238.

From the foregoing explanation it is clear that the operator of the recording system will be alerted to a possible malfunction when the number of hours displayed by unit 242 is relatively high for expected traffic conditions.

Figure 11:
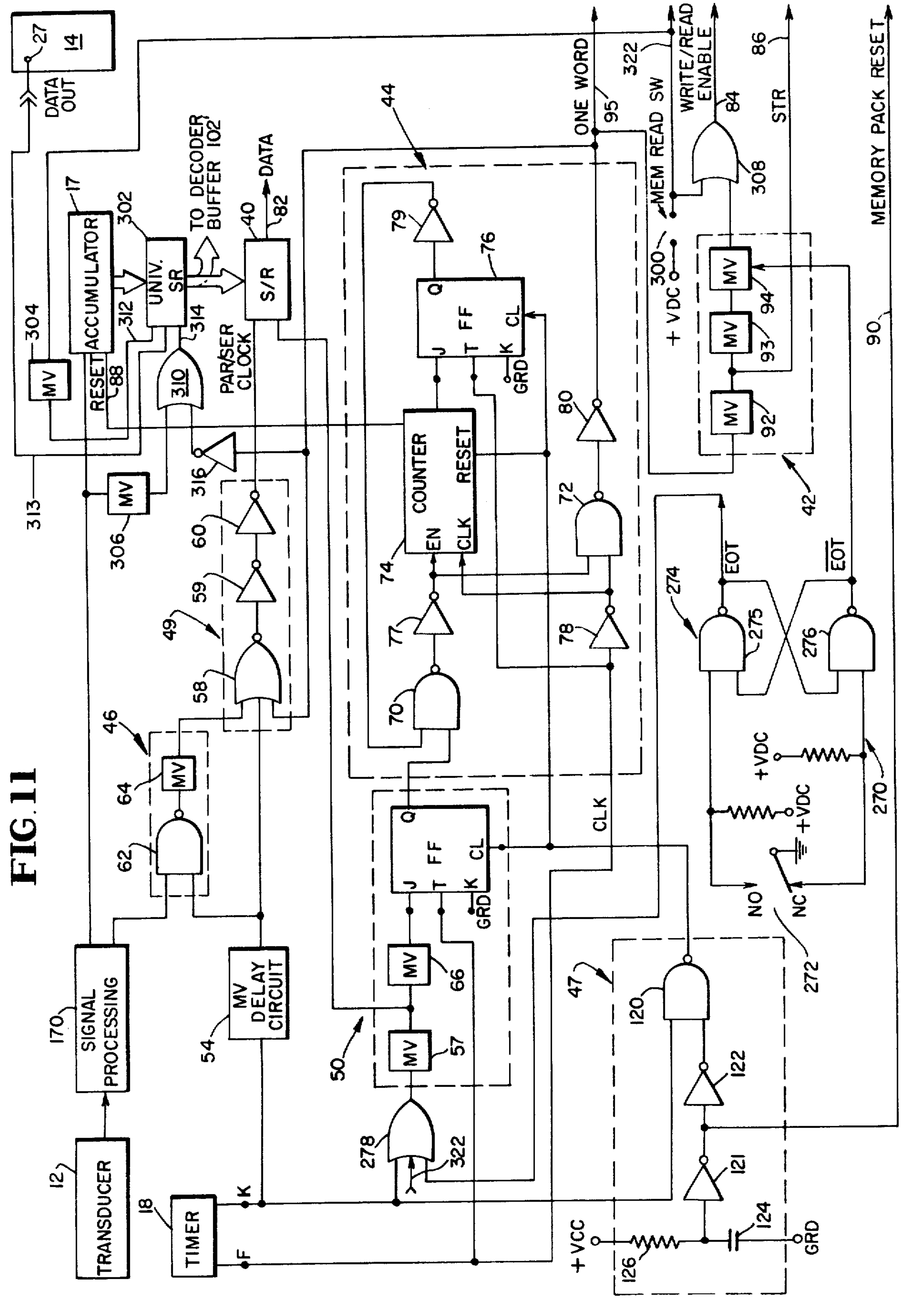
FIG. 11 is a schematic diagram similar to FIG. 4 but including equipment for optionally storing a special code in the removable memory pack to signal the end of a particular traffic counting or other information collection operation.

The information recording system shown in FIG. 11 is the same as the one shown in FIGS. 1 and 4 except that a special signalling circuit 270 has been added for selectively indicating the end or completion of a particular traffic counting operation before another traffic count operation is initiated with the same memory pack. To the extent that the embodiment of FIG. 11 is the same as the embodiment shown in FIGS. 1 and 4, like reference numerals have been applied to designate like parts of the recording system.

The end-of-traffic signalling circuit 270 is particularly useful in situations where the same recorder unit is moved to different locations or sites for collecting traffic or other data at each site before the memory pack is returned to a central processing station for reading out the collected data. Circuit 270 is selectively operated to insert a special coded separator signal in memory 20 to separate the various traffic count accumulations recorded at the different sites. To accomplish this function with the illustrated embodiment, memory 20 is first pre-recorded or programmed with a special code before it is placed in use for a counting operation. This code may be stored in memory 20 at the central processing station after the prior contents of the memory are read out.

The special code mentioned above may be F codes in which a bit having a logic 1 state is stored in each of the usable memory cells in memory 20 before the memory pack is placed in use. Circuit 270 is selectively operable to increment or advance the memory's address counter 22 by a pre-selected number of address locations, thereby leaving F codes (i.e., binary bits having a logic 1 state) in the skipped-over memory locations or cells to form the stored data separator signal.

For incrementing address counter 22, circuit 270 comprises a switch 272 and a pair of NAND gates 275 and 276. Gates 275 and 276 are connected to switch 272 and are further interconnected in the manner shown for generating two reversable logic states as will be described in detail shortly.

The output of gate 275 is connected to one input of an OR gate 278. The other input of OR gate 278 is fed by the K output of timer 18. Gate 278 is inserted into the circuit ahead of multivibrator 57 for permitting multivibrator 57 to be triggered either by the pulse output of timer 18 or by the output of gate 275 when the latter is brought high to a logic 1. The output of gate 276 is connected to the clear terminal of multivibrator 94.

Switch 272 is placed in its illustrated NC (normally closed) position for a normal traffic counting operation in which traffic counts are accumulated and stored in memory 20. When switch 272 is in this position the logic state of the signal at the output of gate 276 will be high at some suitable positive voltage and the logic state of the signal at the output of gate 275 will be low at 0 volts. Multi-vibrator 94 will therefore be enabled to generate the required write/enable pulse signals in response to the one word pulse signals d for storing traffic counts in memory 20. Since the output of gate 275 is low it will have no effect upon multivibrator 57. Multivibrator 57 will therefore be triggered in the usual manner by each of the timer pulses b gated through gate 278 to the input of the multivibrator. The one word generator 44 will respond to each pulse produced by multivibrator 57 to generate its sixteen-pulse one word signal d as previously explained.

When switch 272 is set to its alternate NO position the logic state at the output of gate 276 will be brought low to inhibit multivibrator 94, and the logic state at the output of gate 275 will be brought high producing a positive going transition that is fed through gate 278 to multivibrator 57. Multivibrator 57 responds to this positive going transition by generating a single pulse. The one word generator 44 responds to the single pulse supplied by multivibrator 57 to generate a single sixteen-pulse signal as previously described.

The single sixteen-pulse one-word signal supplied by the one word generator 44 will increment or advance the address counter 22 by 16 counts. The addressable location in memory 20 will therefore be advanced by a corresponding number of consecutive positions. Since multivibrator 94 has been inhibited to prevent the generation of write/enable signals during the time in which counter 22 is being advanced 16 counts by the single sixteen-pulse one word signal, no new data will be written into memory 20 over the F codes (bits of logic 1 state) already stored in the memory. The binary bits of logic 1 state already stored in the memory cells will therefore be preserved at the 16 memory locations that are skipped over by incrementing counter 22 sixteen counts. The 16 bit F-code word thus preserved and stored in memory 20 defines the coded separator signal mentioned above.

As an example involving the use of the end-of-traffic signalling circuit 270, assume that the information recording system is first transported to site A and then to site B for counting traffic at each site before memory pack 14 is removed and returned to a central processing station for reading out the stored data. Assume further that the last data word entry in memory 20 at site A during the traffic counting operation used the memory locations up to location 240, signifying that 15 traffic count data words were entered at site A. Before the information recording system is placed in operation at site B switch 272 is momentarily set to its alternate NO position, thus advancing the count in counter by 16 counts in the manner already described. Incrementing counter 22 in this manner skips over the memory address locations 241 through 256 inclusive so that the traffic counting operation at site B will be initiated from the memory address location 257. Accordingly, all F codes (bits having a logic 1 state) will be preserved in the memory address locations 241–256 to define the coded separator signal in the form of a 16 bit data word having all binary 1's for separating the traffic data collected at site A from the traffic data collected at site B.

When the memory pack 14 is returned to the central processing station to be read out by suitable means such as the translator 130 the coded separator signal mentioned above will appear between the two traffic data accumulations to indicate the end of the traffic counting operation at site A before the traffic counting operation was initated at site B. The cummulative traffic count collected at each of the sites may therefore be determined separately and independently of each other.

Referring back to FIG. 11, the data input and control circuit 16 may optionally be equipped with additional circuitry for selectively reading out the data stored in memory 20 for display on display unit 100. To accomplish this the circuit shown in FIG. 11 is additionally equipped with a memory read switch 300 and suitable logic for displaying the stored data upon closure of switch 300. The switch-controlled logic may comprise a universal parallel-to-parallel and serial-to-parallel shift register 302, a pair of one-shot multivibrators 304 and 306 and a pair of OR gates 308 and 310.

The parallel data input of shift register 302 is connected to the parallel data output of accumulator 17. The parallel data output of shift register 302 is connected to the parallel data input of shift register 40 and also to the decoder and buffer circuit 102 (as in the case of the single channel system shown in FIG. 1) or the decoder and buffer circuit 102' (as in the case of the dual channel system shown in FIG. 5). Accordingly, shift register 302 is connected to feed the pulse count in the accumulator 17 to shift register 40 and also to the decoder and buffer circuit that is used for driving display unit 100.

As shown in FIG. 11, shift register 302 is provided with a parallel/serial enable input a line 312, a memory data input at line 313 and a clock input at line 314. When the universal shift register's parallel/serial enable input is low at zero volts shift register 302 will be placed in its parallel load mode wherein the count-representing data word in accumulator 17 will be loaded into shift register 302 when the clock input on line 314 is brought high to some suitable positive voltage. The data loaded into shift register 302 will be presented to the parallel input of shift register 40 so that when shift register 40 is placed in its parallel load mode in the manner previously described the data contents in shift register 302 will be loaded into shift register 40. The data loaded into shift register 302 will also be presented to the decoder and buffer circuit (102 or 102') for display by unit 100.

The signal condition on line 312 will therefore be low for a traffic counting operation in which the contents of accumulator 17 are periodically transferred to register 40 and from register 40 to memory 20. When the universal shift register's parallel/serial enable input on line 312 is brought high, transfer of the accumulator's data into register 302 will be inhibited, and register 302 will be placed in its serial mode to enable data bits on the data input line 314 to be serially shifted into shift register 302.

As shown, switch 300 is connected between the positive battery and the input of multivibrator 304 so that closure of switch 300 applies a positive going voltage transition to the multivibrator to trigger the multivibrator. The output of multivibrator 304 is connected by line 312 to the parallel/serial enable input of shift register 302.

The data output of memory 20 is fed to the data input of shift register 302 by line 313. The output of OR gate 310 is connected by line 314 to the clock input of shift register 302. The traffic count pulses supplied at the output of the signal processing and format control circuit 170 (or circuit 52 in the case of FIG. 1) are fed to the input of multivibrator 306 as well as to the input of accumulator 17. The output of multivibrator 306 feeds one input of OR gate 310, and the one word output of line 95 is fed through an invertor 316 to the other input of OR gate 310.

When circuit 16 is equipped with the memory read feature of this invention the output of multivibrator 94 will be connected through OR gate 308 to the write/-read enable input of memory 20 to apply the previously described write signal to the memory by way of line 84. Switch 300 is connected to a separate input of gate 308 in the manner shown.

When switch 300 is in its open position multivibrator 94 will drive the write/read enable input of memory 20 through gate 308 to place memory 20 in its write mode, thereby enabling the data which is shifted out of register 40 to be written into the memory, all in the manner previously described. When switch 300 is open the universal shift register's parallel/serial enable input will be low at zero volts, thus placing shift register 302 in its parallel mode for transferring the contents of accumulator 17 to shift register 40.

In response to each traffic count pulse supplied by circuit 170 for count-in by accumulator 17, multivibrator 306 will generate one time-delayed clock pulse which is fed through OR gate 310 to the clock input of shift register 302. When shift register 302 is in its parallel mode, therefore, the count in accumulator 17 will be transferred into shift register 302 shortly after each pulse is counted by the accumulator. Upon receiving the delayed clock pulse from multivibrator 306 shift register 302 will therefore present the data in accumulator 17 to shift register 40 and also to the decoder and buffer circuit (102 and 102') that is used to drive display unit 100.

In order to display the data stored in memory 20 with the circuit described above memory pack 14 is first removed from the recording system and then reinserted into the data input and control circuit 16. As a result, address counter 22 will be reset by the operation of the master reset circuit 47 in the manner previously descriped upon reinserting memory pack 14. Switch 300 is then closed to apply positive voltage to gate 308, thereby generating a read signal on line 84 for placing memory 20 in its read mode.

Closure of switch 300 also applies a positive going voltage transition to multivibrator 304 thereby triggering the multivibrator to bring the parallel/serial enable input of shift register 302 high to place shift register 302 in its serial mode. Data bits stored in memory 20 will therefore be serially loaded into shift register 302 upon pulsing the shift register's clock input.

As shown, switch 300 is connected by a line 322 to a third input of gate 278. When switch 300 is closed, therefore, a positive going voltage transition will also be applied to multivibrator 57 by way of gate 278, thereby causing multivibrator 57 to generate a pulse which starts or activates the one word generator 44 in the manner previously described.

Closure of switch 300 therefore causes generator 44 to supply a single sixteen-pulse one word signal (d) which is fed to address counter 22 to increment the address counter 16 character locations or positions. Since memory 20 has been placed in its read mode by closure of switch 300 the data bits at the first sixteen usable character locations in memory 20 will serially be read out and applied by way of line 313 to the data input of shift register 302.

In addition to being applied to address counter 22 the single sixteen-pulse one word signal is fed through inverter 316 and OR gate 310 to the clock input of shift register 302. One data bit at the universal shift register's data input will therefore be loaded into shift register 302 on the positive going transition of each of the applied sixteen one word pulses. By this operation it will be appreciated that upon the first closure of switch 300 after memory pack 14 has been reinserted into the recording system, the data bits in the first sixteen character locations or storage cells of memory 20 will be serially read out on line 314 and will be serially loaded into shift register 302. The shift register 302 will therefore present this sixteen-bit data word to the decoder and buffer circuit (102 and 102') for display on display unit 100. In order to display the next sixteen-bit data word stored in memory 20 switch 300 is simply opened and reclosed, thereby generating another positive going voltage transition for repeating the operation just described. In this way all of the sixteen-bit data words stored in memory 20 may be read out for display on display unit 100.

It will be appreciated that a microprocessor of suitable design may be employed in place of the previously described data input and control circuit 16 and also a major part of the processing and format control circuit 170 including the parts of circuit 170 for performing the divide-by-two and divide-by-four functions. Such a microprocessor would perform all of the previously described functions or operations of circuit 16 as well as the pulse format control operations or functions of circuit 170.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An information collection and storage system comprising first means for supplying a train of electrical pulses and for obtaining a pulse count that is a function of and determined by the number of said pulses, the number of said pulses being indicative of certain information, a data storage circuit, means providing for the detachable connection of said data storage circuit to said first means to enable said storage circuit to be selectively disconnected from said first means and removed from said information collection and storage system for transportation to a selected location, a volatile read/write memory means in said storage circuit for storing data in binary form, and at least one battery in said storage circuit, said battery being connected to said memory means to supply the power for preserving the data stored in said memory means both when said storage circuit is connected to said first means and removed from said system, said first means including circuit means connected to said memory means when said storage circuit is connected to said first means for writing into said memory data resulting from the pulse count obtained by said first means.

2. The information collection and storage system defined in claim 1 wherein said means providing for the detachable connection of said storage circuit to said first means includes first and second connector means, said first connector means being electrically connected to said first means, and said second connector means being electrically connected to said storage circuit, said first and second connector means being contactable with one another to provide for the electrical connection of said storage circuit to said first means, said battery being connected through said first and second connector means to said first means to apply power to said first means when said storage circuit is connected to said first means.

3. The information collection and storage system defined in claim 2 wherein said circuit means includes at least one resettable device, said first means further comprising reset means connected to said device for resetting said device in response to the application of the battery power to said first means.

4. The information collection and storage system defined in claim 1 wherein said memory means has only a single plane of storage devices, wherein the data written into the memory means is in the form of plural-bit words, and wherein said storage circuit has means cooperating with said circuit means of said first means for writing each bit in said words at a different predetermined address location in the single plane of said memory means.

5. The information collection and storage system defined in claim 1 wherein said memory means has an address port and only a single plane of storage devices, the data written into said memory means being in the form of plural-bit words, said storage circuit having a counter connected to said address port and cooperating with said circuit means of said first means for writing each bit in each of said words at a different predetermined address location in the single plane of said memory means, said first means having reset means connected to said counter through said means providing for the detachable connection of said storage circuit to said first means, said battery being connected to said reset means through said means providing for the detachable connection of said storage circuit to said first means so that power is applied by said battery to said reset means upon detachably connecting said storage circuit to said first means, and said reset means being responsive to the application of the power by said battery for resetting said counter.

6. The information collection and storage system defined in claim 1 wherein said first means comprises a transducer having means for sensing the passage of ground-engaging vehicles past a selected point on a roadway and for generating a predetermined number of said pulses that varies as a function of the number of sensed vehicles.

7. The information collection and storage system defined in claim 1 wherein said memory means has a plurality of terminals that connect to said first means when said storage circuit is connected to said first means, and wherein said storage circuit further includes means connected intermediate said battery and at least pre-selected ones of said terminals to prevent the occurrence of transients in the course of connecting said storage circuit to and disconnecting said storage circuit from said first means.

8. The information collection and storage system defined in claim 1 wherein said memory means has a plurality of terminals that connect to said first means when said storage circuit is electrically connected to said first means, and wherein said storage circuit includes resistance means connected intermediate said battery and at least pre-selected ones of said terminals for clamping each of the pre-selected ones of said terminals to a fixed potential of predetermined polarity upon disconnecting said storage circuit from said first means.

9. The information collection and storage system defined in claim 1 wherein said first means comprises a counter for counting electrical pulses to provide said pulse count, a transducer for generating an electrical pulse in response to each occurrence of a particular event, and means interposed between said transducer and said counter for selectively dividing the number of pulses generated by said transducer by a pre-selected number to feed one pulse to said counter for count-in for every four pulses generated by said transducer.

10. The information collection and storage system defined in claim 1 wherein said first means includes a counter for counting electrical pulses to provide said pulse count, a transducer for generating an electrical pulse in response to each occurrence of a particular event and means electrically connected to said transducer for dividing the number of pulses generated by the transducer by two to feed one pulse to said counter for count-in for every two pulses generated by said transducer.

11. The information collection and recording system defined in claims 9 or 10 wherein said first means further comprises a device for generating an audible sound in response to each pulse fed to said counter for count-in.

12. The information collection and recording system defined in claim 1 wherein said memory means includes a read/write memory having a multiplicity of data-storing character locations, wherein address counter means is electrically connected to said read/write memory in said storage circuit for consecutively addressing the different data storing character locations, in said memory wherein said read/write memory is programmed with a pre-selected binary code at each character location, and wherein said circuit means is connected to said address counter means for selectively incrementing said address counter means to skip a pre-selected number of said character locations without writing data into each character location that is skipped, thereby leaving said code in each character location that is skipped.

13. The information collection and storage system defined in claim 12 wherein said code is an F code stored at each usable character location in said memory.

14. The information collection and storage system defined in claim 1 comprising means connected to said first means for indicating the maximum elapsed time between successively occurring ones of said pulses.

15. A recorder comprising means including a transducer for supplying a train of serially occurring electrical pulses in which the number of pulses is a function of the number of moving bodies passing a given location, a first electrical circuit connected to said pulse supplying means, a second electrical circuit, connector means connected to said first and second circuits to provide for the detachable connection of said second circuit to said first circuit and enabling the selective disconnection of said second circuit from said first circuit for selective removal from said recorder, a volatile read/write memory in said second circuit for storing information in binary form, a battery in said second circuit, said battery being connected to said memory to supply the power for preserving the information stored in said memory both when said second circuit is connected to said first circuit and removed from said recorder, said first circuit comprising an accumulator for counting the pulses produced by said pulse supplying means, means for periodically resetting said accumulator to provide a series of successively occurring pulse-counting time intervals, said accumulator being effective to accumulate a count of the pulses occurring in each of said time intervals to provide a separate pulse count for each time interval, and control means forming a part of said first circuit, said control means being connected to said accumulator and through said connector means to said memory for writing each of the counts accumulated by said accumulator into said memory.

16. The recorder defined in claim 15 wherein said moving bodies are ground-engaging vehicles traveling along a roadway and wherein said transducer has means for sensing the vehicles as they travel past a given place on the roadway.

17. A recorder comprising means for supplying a train of serially occurring electrical pulses in which the number of pulses in a function of the number of descrete moving bodies passing a given location, a first electrical circuit connected to said pulse supplying means, a second electrical circuit means providing for the detachable connection of said second circuit to said first circuit to enable the selective disconnection of said second circuit from said first circuit and the removal of said second circuit from said recorder, a read/write memory in said second circuit for storing information in binary form, and a battery in said second circuit, said battery being connected to said memory to supply the power for preserving the information stored in said memory both when said second circuit is connected to said first circuit and removed from said recorder, said first circuit comprising (a) an accumulator for counting said pulses to provide a plural bit binary number representing the number of counted pulses, (b) a shift register connected to said accumulator, (c) means for periodically producing a control signal, and (d) control means responsive to said control signal each time it is produced for loading the bits of the plural-bit binary number present in said accumulator into said register, for serially shifting the bits of the plural-bit binary number out of the register after they are loaded into the register, for serially writing the bits shifted out of the register into said memory and for resetting said accumulator after loading the plural-bit binary number into said register, said accumulator being effective to accumulate a new count of said pulses each time it is reset by said control means.

18. The recorder defined in claim 17 comprising means in said first circuit for sensing a condition in which said control signal and one of said pulses are present at the same time and means responsive to the sensing of said condition for reloading the number present in said accumulator into said register to update the count in said register before the bits in said register are shifted into said memory.

19. The recorder defined in claim 17 wherein said moving bodies are ground-engaging vehicles traveling along a roadway and wherein said means supplying said electrical pulses comprises a transducer for sensing the vehicles as they travel past a given place on the roadway.

20. A recorder comprising means for supplying a train of electrical pulses in which the number of pulses in a function of the number of moving bodies passing a given location, a first unit having a first electrical circuit electrically connected to said pulse supplying means, a battery-powered memory unit having a second circuit and detachably plugged into said first unit to provide for the electrical connection of said second circuit to said first circuit, said memory unit being selectively removable from said recorder upon unplugging it from said first unit, said second circuit having (a) a volatile semiconductor random access memory means and (b) at least one rechargeable battery connected to said memory means to provide the sole source of power for preserving data stored in said memory means both when memory unit is plugged into said first unit and removed from said recorder, first means in said first circuit for counting the pulses supplied by said pulse supplying means and second means connected to said first means and to said second circuit for periodically writing into said memory means data resulting from the counting of said pulses by said first means.

21. The recorder defined in claim 20 wherein said moving bodies are ground-engaging vehicles traveling along a roadway and wherein said means for supplying said electrical pulses comprises a transducer for sensing the vehicles as they travel past a given place on the roadway.

22. A portable, battery-powered memory pack adapted to be detachably coupled to an electrical circuit which is operative to supply binary data bits in the form of electrical digital signals, said portable, battery-powered memory pack comprising a volatile semiconductor read/write memory means, input means connected to said memory means for applying said binary data bits to said memory means for storage at predetermined locations therein, battery means connected to said memory means to provide the sole source of operating power for said memory means for preserving the data stored therein both when said portable battery-powered memory pack is coupled to said electrical circuit and uncoupled from said electrical circuit, terminal means adapted to be connected to said electrical circuit when said memory pack is coupled to said electrical circuit, and means electrically connecting said battery means to said terminal means for applying power to said electrical circuit when said memory pack is coupled to said electrical circuit.

23. A method for storing information comprising the steps of converting the information to be stored into a number of serially occurring electrical pulses, electrically counting the electrical pulses, periodically transferring the count accumulated as a result of counting a number of said pulses into a shift register in the form of a plural-bit word, shifting the bits of each word out of said register, writing each bit of each word shifted out of the register into a different address location of a random access memory, and continuing to electrically count said pulses while shifting the bits out of said register and writing them in said memory.

24. A method of collecting vehicle traffic data comprising the steps of sensing the number of ground-engaging vehicles passing a given location on a roadway and producing a train of electrical pulses in which the number of pulses is a function of the number of sensed vehicles, supplying memory address signals, storing data representative of the number of said pulses in a volatile, portable, battery-powered random access memory unit at storage locations determined by said address signals, transporting said memory unit under power to a data center after said data is stored in said memory unit and reading out the data stored in said memory unit at said data center.

25. An information recording system comprising means for supplying a series of serially occurring electrical pulses in which the number of pulses is indicative of certain information, an electrical circuit connected to said pulse supplying means and including means for obtaining a pulse count that is a function of and is determined by the number of said pulses, and a binary data storage unit, means providing for the detachable electrical connection of said storage unit to said circuit, said storage unit having (a) memory means containing a multiplicity of binary bit storage locations for storing bits of binary data representing said pulse count and (b) battery means electrically connected to said memory means to supply power for preserving the data stored in said memory means both when said unit is connected to said circuit and when said unit is detached from said circuit for removal from the information recording system.

26. The information recording system defined in claim 25 wherein said circuit includes means for selectively establishing a signal in the form of stored coded bits at a pre-selected number of said storage locations for separating different groups of data bits stored by said memory means.

27. The information recording system defined in claim 25 wherein said memory means is programmed with a pre-selected bit code at said storage locations, and wherein said circuit includes means for selectively skipping over a pre-selected number of said storage locations while preventing data from being written into each storage location that is skipped over to leave said code in each skipped-over storage location for providing a separation between different groups of data bits written into said memory means.

28. The information recording system defined in claim 25 wherein said pulse supplying means comprises a transducer for sensing vehicular traffic travelling on a road and for generating at least one electrical pulse for each vehicle axle passing a point on said road, and wherein said electrical circuit includes means for selectively dividing the number of pulses generated by said transducer by a pre-selected number to provide a pulse train having one pulse for every four pulses generated by said transducer, said pulse count-obtaining means comprising a counter electrically connected to said dividing means for counting the number of pulses in said train to provide said pulse count.

29. The information recording system defined in claim 25 wherein said pulse supplying means comprises a vehicle sensing transducer for generating an electrical pulse in response to the passage of each vehicle axle over a given point on a road, and wherein said electrical circuit includes means for dividing the pulses generated by said transducer by two to provide a pulse train having one pulse for every two pulses generated by said transducer, said pulse count-obtaining means comprising a counter electrically connected to said dividing means for counting the number of pulses in said train to provide said pulse count.

30. The information recording system defined in claim 25 including a digital display unit, said electrical circuit including selectively operable circuit means for reading the stored data out of said memory and for displaying the data in numerical form on said display unit.

31. A recorder comprising at least two separate signal channels each having (a) means for supplying a train of serially occurring electrical pulses in which the number of pulses is a function of the number of moving bodies passing a given location, (b) an electrical circuit connected to said pulse supplying means and having means for obtaining a pulse count that is a function of and is determined by the number of pulses in said train, (c) a data storage unit, (d) means providing for the detachable connection of said storage unit to said electrical circuit, (e) a read/write memory forming a part of said unit and having a multiplicity of data bit storage locations for storing data in binary form, (f) means forming a part of said unit for addressing the different storage locations in said memory, (g) battery means in said unit for preserving the data stored in said memory at least when said storage unit is removed from said recorder, and (h) further means forming a part of said electrical circuit and connected to said pulse count-obtaining means and also to said memory and said memory address means when said unit is connected to said circuit for writing into said memory data resulting from the pulse count obtained by said pulse count-obtaining means, said recorder further comprising means for selectively connecting the pulse supplying means of one of said two channels to the pulse supplying means of the other of said two channels for blocking the transmission of a pulse from the pulse supplying means of one of said channels in response to the occurrence of a pulse in the pulse supply means of the other of said channels.

32. The recorder defined in claim 31 wherein said moving bodies are ground-engaging vehicles traveling along a roadway and wherein said means for supplying said electrical pulses in each of said channels comprises a transducer for sensing the vehicles as they travel by a given place on the roadway.

33. An information recorder comprising an electrical circuit, means electrically connected to said circuit for supplying a train of serially occurring electrical pulses to said circuit in which the number of said pulses is determined by the number of moving objects passing a given location, means in said circuit for counting the number of pulses supplied to said circuit by said pulse supplying means in each of a series of successively occurring time periods of equal time durations to provide a separate pulse count for each of said time periods, a data storage unit, means providing for the detachable electrical connection of said storage unit to said electrical circuit to enable said storage unit to be selectively disconnected from said circuit and removed from said recorder, a volatile read/write memory forming a part of said storage unit and having a multiplicity of data storage locations for storing data in binary form, means forming a part of said storage unit for addressing different storage locations in said memory, battery means disposed in said unit and electrically connected to said memory for supplying power to preserve data stored in said memory both when said storage unit is connected to said electrical circuit and removed from said recorder, and further means forming a part of said electrical circuit and connected to said pulse counting means and also to said memory and said memory address means when said storage unit is connected to said electrical circuit to control the write-in of said pulse counts into said memory and to provide for the storage of said pulse counts at memory locations where the stored pulse counts remain descrete from one another.

34. An information recorder comprising at least two separate signal channels each having (a) means for supplying a train of serially occurring electrical pulses in which the number of pulses is indicative of certain information, (b) an electrical circuit connected to said pulse supplying means and having means for obtaining a pulse count that is a function of and is determined by the number of pulses in said train, (c) a data storage unit, (d) means providing for the detachable connection of said storage unit to said electrical circuit, (e) a read/write memory forming a part of said unit and having a multiplicity of data bit storage locations for storing data in binary form, (f) means forming a part of said unit for addressing the different storage locations in said memory, (g) battery means in said unit for preserving the data stored in said memory at least when said storage unit is removed from said recorder, and (h) further means forming a part of said electrical circuit and connected to said pulse count-obtaining means and also to said memory and said memory address means when said unit is connected to said circuit for writing into said memory data resulting from the pulse count obtained by said pulse count-obtaining means, said information recorder further including means for selectively connecting one of said two channels to the other of said two channels for providing the pulse count-obtaining means in one of said channels with a pulse count that is determined by the number of pulses supplied by the pulse supplying means of both of said channels.

35. A recorder comprising means including a transducer for supplying a train of serially occurring electrical pulses in which the number of pulses is indicative of certain information, a first electrical circuit connected to said pulse supplying means, a second electrical circuit, connector means connected to said first and second circuits to provide for the detachable connection of said second circuit to said first circuit and enabling the selective disconnection of said second circuit from said first circuit for selective removal from said recorder, a volatile read/write memory in said second circuit for storing information in binary form, a battery in said second circuit, said battery being connected to said memory to supply the power for preserving the information stored in said memory at least when said second circuit is removed from said recorder, said first circuit comprising an accumulator for counting the pulses produced by said pulse supplying means, means for periodically resetting said accumulator to provide a series of successively occurring pulse-counting time intervals, said accumulator being effective to accumulate a count of the pulses occurring in each of said time intervals to provide a separate pulse count for each time interval, and control means forming a part of said first circuit, said control means being connected to said accumulator and through said connector means to said memory for writing each of the counts accumulated by said accumulator into said memory.

36. A recorder comprising means for supplying a train of serially occurring electrical pulses in which the number of pulses is a function of certain information, an electrical circuit connected to said pulse supplying means and having means for obtaining a pulse count that is a function of and is determined by the number of pulses in said train, a data storage unit, means providing for the detachable electrical connection of said storage unit to said electrical circuit to enable said storage unit to be selectively disconnected from said circuit and removed from said recorder, a read/write memory forming a part of said unit and having a multiplicity of data bit storage locations for storing data in binary form, means forming a part of said unit for addressing the different storage locations in said memory, and battery means in said unit for preserving the data stored in said memory at least when said storage unit is removed from said recorder, and further means forming a part of said electrical circuit and connected to said pulse count-obtaining means and also to said memory and said memory addressing means when said unit is connected to said circuit for writing into said memory data resulting from the pulse count obtained by said pulse count-obtaining means.

37. The recorder defined in claim 36 wherein said memory addressing means comprises a counter for consecutively addressing the different data storage locations in said memory, wherein said read/write memory is programmed with a pre-selected binary code at each storage location, and wherein said electrical circuit includes means for selectively incrementing said counter to skip a pre-selected number of said storage locations without writing data into each storage location that is skipped, thereby leaving said code in each storage location that is skipped.

38. The recorder defined in claim 36 wherein said electrical circuit includes means for indicating the maximum elapsed time between successively occurring ones of the pulses in said train.

39. A portable, battery-powered memory pack adapted to be detachably coupled to an electrical circuit which is operative to supply binary data bits in the form of electrical digital signals, said portable, battery-powered memory pack comprising a volatile semiconductor read/write memory means, input means connected to said memory means for applying said binary data bits to said memory means for storage at predetermined locations therein, battery means connected to said memory means to provide a source of operating power for said memory means for preserving the data stored therein at least when said portable battery-powered memory pack is uncoupled from said electrical circuit, means for generating different address signals for said memory means, and circuit means for applying said address signals to address terminals of said memory means for causing said memory means to store the bits applied to said input means at locations that are determined by the address signals.

40. A portable, battery-powered memory pack adapted to be detachably coupled to an electrical circuit which is operative to supply binary data bits in the form of electrical digital signals, said portable, battery-powered memory pack comprising a volatile semiconductor read-write memory means, input means connected to said memory means for applying said binary data bits to said memory means for storage at predetermined locations therein, battery means connected to said memory means to provide a source of operating power for said memory means for preserving the data stored therein at least when said portable battery-powered memory pack is uncoupled from said electrical circuit, an address terminal adapted to be detachably connected to a source of electrical pulses that is exterior of the battery powered memory pack, an address counter connected to said address terminal for counting in the number of pulses fed from said electrical pulse source and for producing a plural-bit binary address signal whose numerical magnitude varies with the number of counted pulses, circuit means for applying said address signal to an address port of said memory means, terminal means connected to said memory means for feeding read-out and write-in command signals to said memory means, and a data output terminal connected to said memory means, said input means comprising a data input terminal, said memory means being responsive to said read-out signal to cause stored data at a location determined by the numerical magnitude of the address signal present at said port to be read out on said data output terminal, and said memory means further being responsive to said write-in signal to write in data applied at said data input terminal into a location that is determined by the numerical magnitude of said address signal present at said port.

41. The portable battery-powered memory pack defined in claim 40 comprising means connected intermediate said data input terminal and a pre-selected terminal of said battery to clamp said data input terminal to battery potential when the battery powered memory pack is uncoupled from said electrical circuit.

42. The portable battery-powered memory pack defined in claim 40 including resistor means connected between each of said data input, data output, address and additional terminals and said battery for clamping each of the terminals to a fixed potential when said battery-powered memory pack is uncoupled from said electrical circuit.

43. A portable, battery-powered memory pack adapted to be detachably coupled to an electrical circuit which is operative to supply binary data bits in the form of electrical digital signals, said portable, battery-powered memory pack comprising a read/write memory, input means connected to said memory means for applying said binary data bits to said memory for storage, battery means connected to said memory to provide a source of power for said memory, means for generating different address signals for said memory, and circuit means for applying said address signals to address terminals of said memory for causing said memory to store the binary data bits applied to said input means at storage locations that are determined by the address signals.

44. The portable, battery-powered memory pack defined in claim 43 including terminal means adapted to be connected to said electrical circuit when the battery-powered memory pack is coupled to said electrical circuit, and means electrically connecting said battery means to said terminal means to apply power to said electrical circuit when said battery-powered memory pack is coupled to said electrical circuit.

45. A recorder comprising at least two separate signal channels each having (a) means for supplying a train of serially occurring electrical pulses in which the number of pulses is indicative of certain information, (b) an electrical circuit connected to said pulse supplying means and having means for obtaining a pulse count that is a function of and is determined by the number of pulses in said train, (c) a data storage unit, (d) a read/-write memory forming a part of said unit and (e) further means forming a part of said electrical circuit and connected to said pulse count-obtaining means and also to said memory for writing into said memory data resulting from the pulse count obtained by said pulse count-obtaining means, said recorder further comprising means for selectively connecting the pulse supplying means of one of said two channels to the pulse supplying means of the other of said two channels for blocking the transmission of a pulse from the pulse supplying means of one of said channels in response to the occurrence of a pulse in the pulse supply means of the other of said channels.

46. An information recorder comprising at least two separate signal channels each having (a) means for supplying a train of serially occurring electrical pulses which the number of pulses is indicative of certain information, (b) an electrical circuit connected to said pulse supplying means and having means for obtaining a pulse count that is a function of and is determined by the number of pulses in said train, (c) a data storage unit, (d) means providing for the detachable connection of said storage unit to said electrical circuit, (e) a read/write memory forming a part of said unit, and (e) further means forming a part of said electrical circuit and connected to said pulse count-obtaining means and also to said memory when said unit is connected to said circuit for writing into said memory data resulting from the pulse count obtained by said pulse count-obtaining means, said information recorder further including means for selectively connecting one of said two channels to the other of said two channels for providing the pulse count-obtaining means in one of said channels with a pulse count that is determined by the number of pulses supplied by the pulse supplying means of both of said channels.

* * * * *